United States Patent
Kato et al.

(10) Patent No.: US 11,330,129 B2
(45) Date of Patent: May 10, 2022

(54) IMAGE FORMING SYSTEM, IMAGE FORMING APPARATUS, AND STORING MEDIUM STORING APPLICATION CONTROL PROGRAM

(71) Applicant: KYOCERA Document Solutions Inc., Osaka (JP)

(72) Inventors: Yui Kato, Osaka (JP); Tatsuya Hanayama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/152,929

(22) Filed: Jan. 20, 2021

(65) Prior Publication Data

US 2021/0234983 A1  Jul. 29, 2021

(30) Foreign Application Priority Data

Jan. 24, 2020  (JP) .............................. JP2020-009933
Jan. 24, 2020  (JP) .............................. JP2020-009936
Jan. 24, 2020  (JP) .............................. JP2020-009937

(51) Int. Cl.
*H04N 1/00* (2006.01)

(52) U.S. Cl.
CPC ....... *H04N 1/00938* (2013.01); *H04N 1/0097* (2013.01); *H04N 1/00347* (2013.01); *H04N 2201/0094* (2013.01)

(58) Field of Classification Search
None
See application file for complete search history.

(56) References Cited

U.S. PATENT DOCUMENTS

2008/0307319 A1* 12/2008 Iwata .................. G06K 15/00
                                                     715/748
2013/0286416 A1* 10/2013 Saurabh ................ G06F 3/123
                                                     358/1.13
2019/0373130 A1* 12/2019 Han ........................ G06F 8/62

FOREIGN PATENT DOCUMENTS

JP          2018-098741        6/2018

* cited by examiner

*Primary Examiner* — Frantz Bataille
(74) *Attorney, Agent, or Firm* — Lex IP Meister, PLLC

(57) ABSTRACT

In an image forming system provided with a plurality of image forming apparatuses, at least one of the image forming apparatuses takes over an application owned by other the image forming apparatus, and acquires, from a transfer source, the number of times of application use indicating the number of times of using the application in the image forming apparatus being the transfer source of the application. When execution of the application is finished, the image forming apparatus determines between the image forming apparatus itself, and the transfer source of the application, in which the number of times of application use of the application is larger, based on the number of times of application use acquired from the transfer source, and transfers the application to the transfer source, when the transfer source has a larger number of times of application use than the transfer destination.

14 Claims, 26 Drawing Sheets

10 IMAGE FORMING SYSTEM

FIG. 1

10 IMAGE FORMING SYSTEM

- 20 IMAGE FORMING APPARATUS
- 30 IMAGE FORMING APPARATUS
- 40 IMAGE FORMING APPARATUS
- 50 IMAGE FORMING APPARATUS

FIG. 4

27g APPLICATION OWNER EQUIPMENT INFORMATION

| APPLICATION ID | SERIAL NUMBER | ICON ID |
|---|---|---|
| APP0001 | SN000001 | ICON0001 |
| . | . | . |
| . | . | . |
| . | . | . |

27h USER-ASSOCIATED APPLICATION INFORMATION

FIG. 6

27i APPLICATION OWNER EQUIPMENT DETERMINATION INFORMATION

| APPLICATION ID | MEMORY REMAINING AMOUNT | NUMBER OF TIMES OF APPLICATION USE |
|---|---|---|
| APP0001 | 50MB | 123 |
| · | · | · |
| · | · | · |
| · | · | · |

FIG. 20

27j OPTIMUM APPLICATION OWNER EQUIPMENT INFORMATION

| APPLICATION ID | SERIAL NUMBER | MEMORY REMAINING AMOUNT | NUMBER OF TIMES OF APPLICATION USE |
|---|---|---|---|
| APP0001 | SN000001 | 50MB | 123 |
| . | . | . | . |
| . | . | . | . |
| . | . | . | . |

IMAGE FORMING SYSTEM, IMAGE FORMING APPARATUS, AND STORING MEDIUM STORING APPLICATION CONTROL PROGRAM

INCORPORATION BY REFERENCE

This application is based upon, and claims the benefit of priority from, corresponding Japanese Patent Application No. 2020-009933, Japanese Patent Application No. 2020-009936 and Japanese Patent Application No. 2020-009937 filed in the Japan Patent Office on Jan. 24, 2020, the entire contents of which are incorporated herein by reference.

BACKGROUND

Field of the Invention

The present disclosure relates to an image forming system including a plurality of image forming apparatuses, an image forming apparatus, and a storing medium storing an application control program.

Description of Related Art

There is known, as a typical image forming system, a configuration in which an application is temporarily installed in a first image forming apparatus for execution, when the application that is not installed in the first image forming apparatus but is installed in a second image forming apparatus is selected by the first image forming apparatus in order to solve a problem that work of installing a same application in each of a plurality of image forming apparatuses is cumbersome, and a problem that the number of applications to be installed per image forming apparatus increases by installing a same application in each of a plurality of image forming apparatuses, and as a result, the capacity of a memory of the image forming apparatus becomes insufficient, in a case where the same application is used in the plurality of image forming apparatuses. In the typical image forming system, an application that is temporarily installed in the first image forming apparatus is uninstalled from the first image forming apparatus after having been executed in the first image forming apparatus in order to secure the capacity of the memory in the first image forming apparatus.

SUMMARY

An image forming system according to the present disclosure is an image forming system provided with a plurality of image forming apparatuses. At least one of the image forming apparatuses takes over an application owned by other the image forming apparatus, and acquires, from a transfer source, use information indicating information relating to use of the application in the image forming apparatus, being the transfer source of the application. When execution of the application is finished, the image forming apparatus determines between the image forming apparatus itself, and the transfer source of the application that satisfies a specific condition relating to use of the application, based on the use information acquired from the transfer source, and transfers the application to the transfer source when the transfer source satisfies the specific condition.

An image forming apparatus according to the present disclosure is an image forming apparatus provided with an installation execution unit that installs an application. The image forming apparatus provided with the installation execution unit includes a file transmission unit that transmits, to another image forming apparatus, a file for installation of the application owned by the image forming apparatus itself. The file transmission unit transmits the file to the image forming apparatus, being a request source of the file, when the file is requested by the other image forming apparatus. The installation execution unit uninstalls the application from the image forming apparatus when the file transmission unit, included in the image forming apparatus provided with the installation execution unit itself, transmits the file for installation of the application. The installation execution unit causes the image forming apparatus, provided with the installation execution unit itself, to own the application by installing the application with use of the file transmitted from the image forming apparatus when requesting the other image forming apparatus for the file, and acquires, from a transmission source, use information indicating information relating to use of the application in the image forming apparatus, being the transmission source of the file, for installation of the application. When execution of the application is finished, the file transmission unit determines between the image forming apparatus provided with the file transmission unit itself, and the transmission source of the file for installation of the application that satisfies a specific condition relating to use of the application, based on the use information acquired from the transmission source, and transmits, to the transmission source, the file for installation of the application when the transmission source satisfies the specific condition.

A non-transitory computer-readable storing medium according to the present disclosure stores an application control program causing an image forming apparatus to achieve an installation execution unit that installs an application. The application control program causes the image forming apparatus that achieves the installation execution unit to achieve a file transmission unit that transmits, to another image forming apparatus, a file for installation of the application owned by the image forming apparatus itself. The file transmission unit transmits the file to the image forming apparatus being a request source of the file, when the file is requested by the other image forming apparatus. The installation execution unit uninstalls the application from the image forming apparatus, when the file transmission unit to be achieved by the image forming apparatus that achieves the installation execution unit itself transmits the file for installation of the application. The installation execution unit causes the image forming apparatus that achieves the installation execution unit itself to own the application by installing the application with use of the file transmitted from the image forming apparatus, when requesting the other image forming apparatus for the file, and acquires, from a transmission source, use information indicating information relating to use of the application in the image forming apparatus being the transmission source of the file for installation of the application. When execution of the application is finished, the file transmission unit determines between the image forming apparatus that achieves the file transmission unit itself, and the transmission source of the file for installation of the application that satisfies a specific condition relating to use of the application, based on the use information acquired from the transmission source, and transmits, to the transmission source, the file for installation of the application when the transmission source satisfies the specific condition.

BRIEF DESCRIPTION OF THE DRAWINGS

FIG. 1 is a block diagram of an image forming system according to one embodiment of the present disclosure;

FIG. 4 is a diagram showing one example of application owner equipment information shown in FIG. 2;

FIG. 6 is a diagram showing one example of application owner equipment determination information shown in FIG. 2;

FIG. 12 is a flowchart of an operation of the image forming apparatus shown in FIG. 2 when the user logs in;

FIG. 20 is a diagram showing one example of optimum application owner equipment information shown in FIG. 19;

DETAILED DESCRIPTION

In the following, an embodiment according to the present disclosure is described with reference to the accompanying drawings.

First, a configuration of an image forming system according to one embodiment of the present disclosure is described.

FIG. 1 is a block diagram of an image forming system 10 according to the present embodiment.

As shown in FIG. 1, the image forming system 10 includes an image forming apparatus 20 such as a multi-function peripheral (MFP) device and a dedicated printer, and image forming apparatuses 30, 40, and 50, each of which has a similar configuration to the image forming apparatus 20. In addition to the image forming apparatuses 20, 30, 40, and 50, the image forming system 10 can be provided with at least one image forming apparatus having a similar configuration to the image forming apparatus 20. The image forming apparatus is provided with a serial number, which is identification information. All the image forming apparatuses in the image forming system 10 are connected to one another by grid computing.

Figure 2:
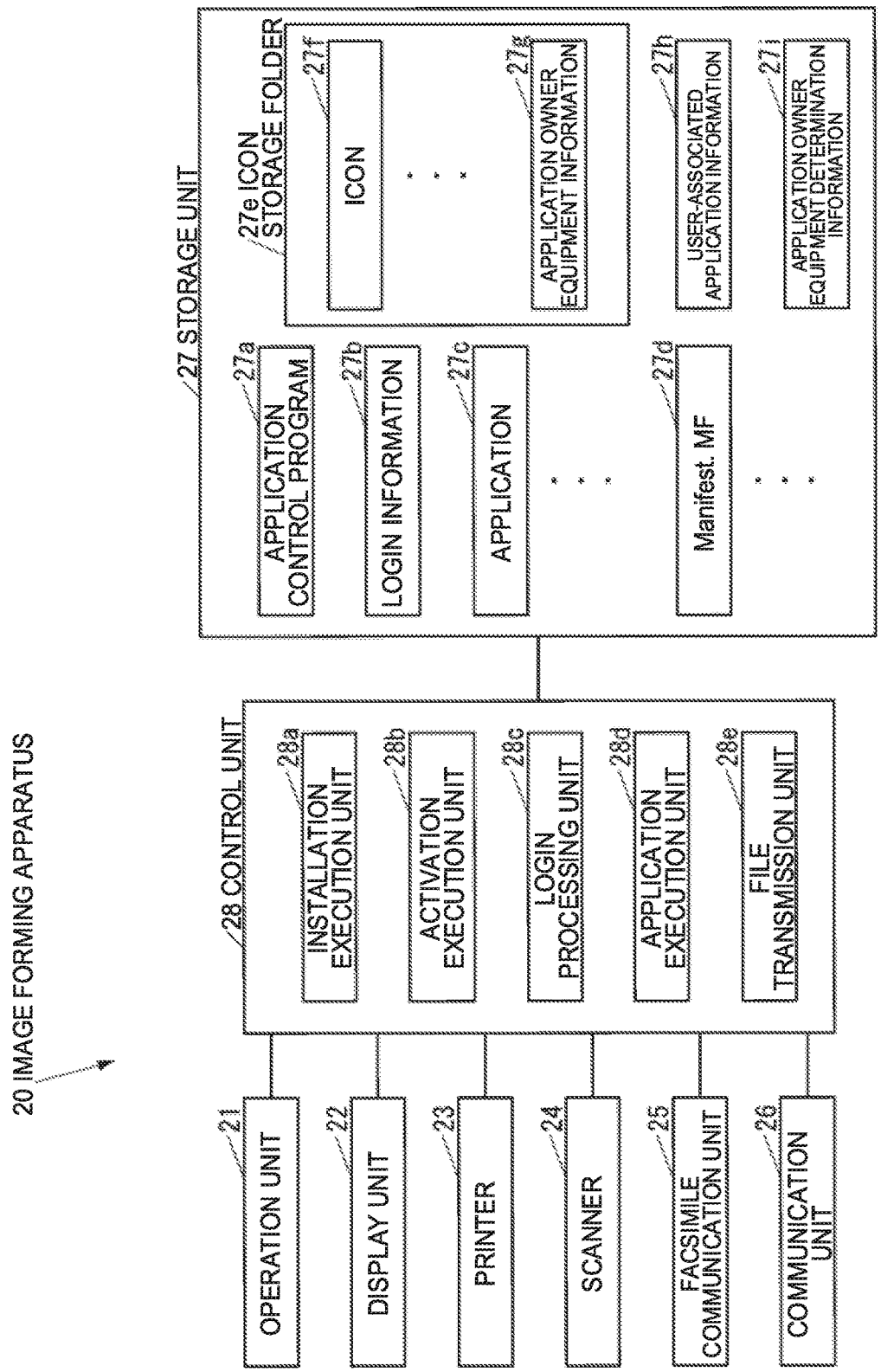
FIG. 2 is a block diagram of an image forming apparatus shown in FIG. 1 when the image forming apparatus is an MFP device.

FIG. 2 is a block diagram of the image forming apparatus 20 when the image forming apparatus is an MFP device.

As shown in FIG. 2, the image forming apparatus 20 includes an operation unit 21, which is an operation device such as a button, for example, through which various operations are input; a display unit 22, which is a display device such as a liquid crystal display (LCD), for example, which displays various pieces of information; a printer 23, which is a printing device that prints an image on a recording medium such as paper; a scanner 24, which is a scanning device that reads an image from a document; a facsimile communication unit 25, which is a facsimile device that performs facsimile communication with an unillustrated external facsimile device via a communication line such as a public telephone line; a communication unit 26, which is a communication device that performs communication with an external device via a network such as a local area network (LAN) or the Internet, or directly without a network wiredly or wirelessly; a storage unit 27, which is a non-volatile storage device such as a semiconductor memory or a hard disk drive (HDD) that stores various pieces of information, for example; and a control unit 28 that controls the entirety of the image forming apparatus 20.

The storage unit 27 stores an application control program 27a for executing control relating to an application to be described later. The application control program 27a may be installed in the image forming apparatus 20 at a manufacturing stage of the image forming apparatus 20, or may be additionally installed in the image forming apparatus 20 from an external storing medium such as a universal serial bus (USB) memory, or may be additionally installed in the image forming apparatus 20 via a network.

The storage unit 27 stores login information 27b for login by the user of the image forming apparatus 20 itself.

Figure 3:
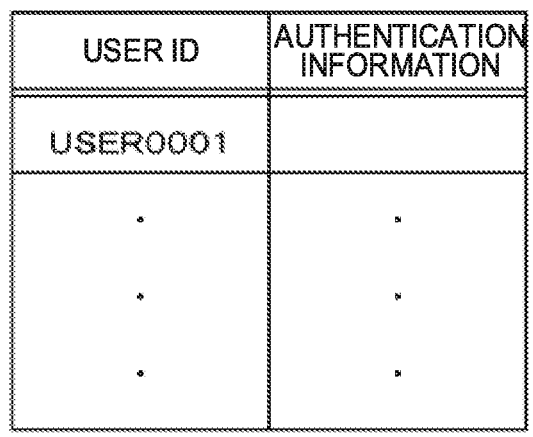
FIG. 3 is a diagram showing one example of login information shown in FIG. 2.

FIG. 3 is a diagram showing one example of the login information 27b.

As shown in FIG. 3, the login information 27b indicates a user ID as the user's identification information, and authentication information for user's authentication in association with each other for each user. The authentication information is, for example, a password. In FIG. 3, a specific content of the authentication information is omitted.

As shown in FIG. 2, the storage unit 27 is capable of storing an application 27c. The storage unit 27 is capable of storing at least one application in addition to the application 27c. The application has an application ID, which is identification information.

The storage unit 27 is capable of storing Manifest.MF 27d, which is a file indicating various pieces of information relating to the application 27c. The storage unit 27 is capable of storing Manifest.MF for each application. Manifest.MF includes application data, which are information necessary for installation of an application, and application setting data indicating various setting values of the application. The application data include information such as the name and the application ID of an application, for example.

The storage unit 27 includes an icon storage folder 27e for storing an icon of an application. The icon storage folder 27e is capable of storing an icon 27f of the application 27c. The icon storage folder 27e is capable of storing at least one application icon in addition to the icon 27f. The icon has an icon ID, which is identification information. In addition, the icon storage folder 27e stores application owner equipment information 27g indicating an image forming apparatus that owns an application.

FIG. 4 is a diagram showing one example of the application owner equipment information 27g.

As shown in FIG. 4, the application owner equipment information 27g indicates an application ID of an application, a serial number of an image forming apparatus that owns the application, and an icon ID of an icon of the application in association with one another.

As shown in FIG. 2, the storage unit 27 stores user-associated application information 27h indicating an application associated with the user. The user-associated application information 27h is changeable in response to an instruction via the operation unit 21 or the communication unit 26.

Figure 5:
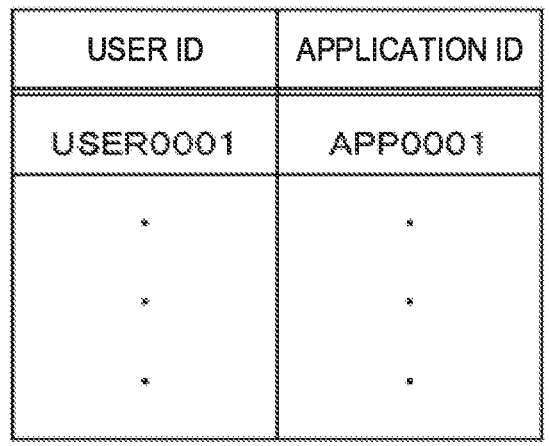
FIG. 5 is a diagram showing one example of user-associated application information shown in FIG. 2.

FIG. 5 is a diagram showing one example of the user-associated application information 27h.

As shown in FIG. 5, the user-associated application information 27h indicates a user ID of a user and an application ID of an application associated with the user.

As shown in FIG. 2, the storage unit 27 stores application owner equipment determination information 27i indicating information of the image forming apparatus 20 itself for determining an image forming apparatus that should own an application.

FIG. 6 is a diagram showing one example of the application owner equipment determination information 27i.

As shown in FIG. 6, the application owner equipment determination information 27i indicates an application ID of an application, a remaining amount of a memory, specifically, a RAM (hereinafter, referred to as a "memory remaining amount") after installation of the application, and the number of times of using the application (hereinafter, referred to as the "number of times of application use").

The control unit 28 shown in FIG. 2 includes, for example, a central processing unit (CPU), a read only memory (ROM) that stores a program and various pieces of data, and a random access memory (RAM) as a memory for use as a work area of the CPU of the control unit 28. The CPU of the control unit 28 executes the program stored in the storage unit 27 or in the ROM of the control unit 28.

The control unit 28 achieves, by executing the application control program 27a, an installation execution unit 28a that installs an application, an activation execution unit 28b that executes activation of an application, a login processing unit 28c that executes login processing by the user, an application execution unit 28d that executes an application, and a file transmission unit 28e that transmits, to another image forming apparatus, a file for installation of an application.

When an activation key, which is information for activation of an application, is input, the activation execution unit 28b executes activation of a target application, when information generated according to a specific rule, based on an application ID of the target application for activation, and a serial number of the image forming apparatus 20 itself matches the input activation key.

Next, creation of an application (hereinafter, referred to as an "official application"), which is permitted to be released in the market is described.

Figure 7:
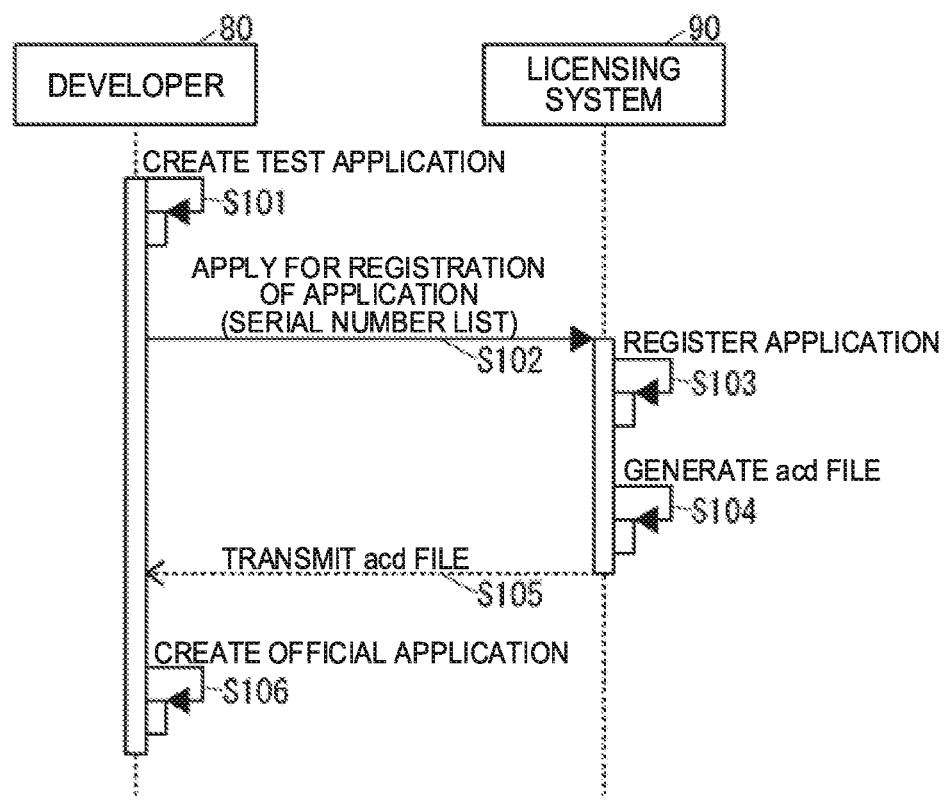
FIG. 7 is a sequence diagram when an application developer creates an official application as an application shown in FIG. 2.

FIG. 7 is a sequence diagram when an official application is created by a developer 80 of an application.

As shown in FIG. 7, the developer 80 creates an application (hereinafter, referred to as a "test application") before the application is permitted to be released in the market by using a computer (not shown) (S101).

After the work in S101, the developer 80 applies for registration of an application to a licensing system 90 by using a computer (not shown) (S102). The licensing system 90 may be constituted of one computer or may be constituted of a plurality of computers. The licensing system 90 is administered by a manufacturer of an image forming apparatus, for which the developer 80 wishes to operate an application. When an application is registered in the licensing system 90, it means that the application is permitted to be released in the market by the licensing system 90. The application in S102 includes information (hereinafter, referred to as "release information") necessary for releasing an application in the market, and a list of serial numbers (hereinafter, referred to as a "serial number list") of image forming apparatuses, for which the developer 80 wishes to operate the application. The release information includes, for example, an application name, which is the name of the application, an application type, which is the type of the application, and a "development company", which is information indicating the developer 80 of the application.

Upon receiving the application in S102, the licensing system 90 registers a target application in the application in S102 (S103).

Then, the licensing system 90 generates an acd file, which is a file necessary for releasing the application in the market (S104). Herein, the licensing system 90 writes, in the acd file, all the serial numbers indicated in the serial number list included in the application in S102.

After the processing in S104, the licensing system 90 transmits the acd file generated in S104 to the developer 80 (S105).

Upon receiving the acd file transmitted from the licensing system 90 in S105 by a computer (not shown), the developer 80 creates an official application by a computer (not shown), based on the test application created in S101, and the acd file received from the licensing system 90 (S106).

Figure 8:
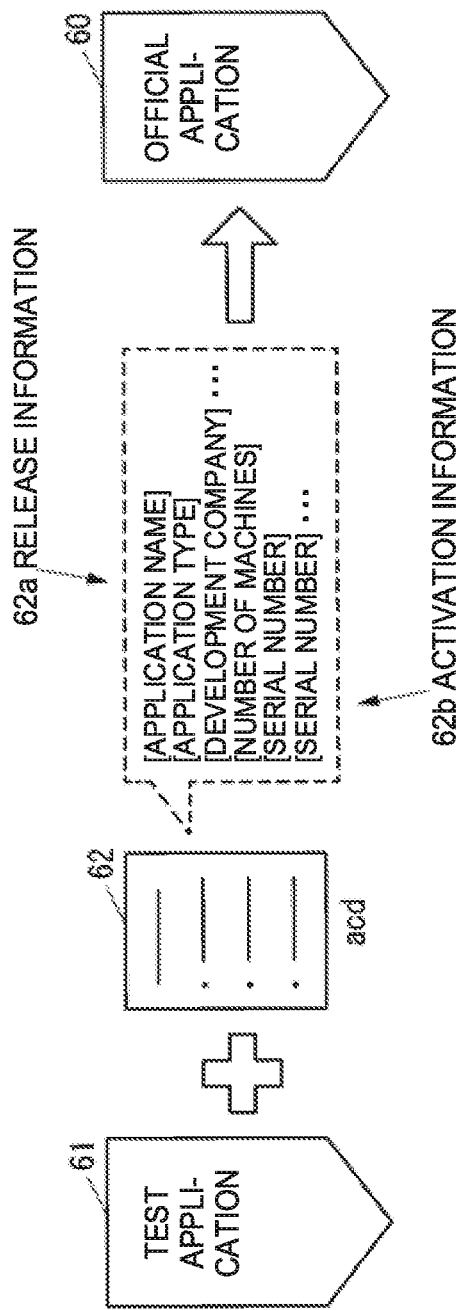
FIG. 8 is a diagram showing how the official application shown in FIG. 7 is created based on a test application and an acd file.

FIG. 8 is a diagram showing how an official application 60 is created based on a test application 61 and an acd file 62.

As shown in FIG. 8, the official application 60 is created based on the test application 61 and the acd file 62.

The acd file 62 includes release information 62a, and activation information 62b, which is information for operating an application on an image forming apparatus. The release information 62a includes, for example, an application name, an application type, and a development company. The activation information 62b includes the number of machines indicating the number of image forming apparatuses, whose serial numbers are written in the acd file 62, and all the serial numbers indicated in the serial number list included in the application in S102. The number of machines is information indicating the number of serial numbers included in the activation information 62b for appropriately reading all the serial numbers from the activation information 62b. Information included in the acd file 62 is encrypted. All image forming apparatuses in the image forming system 10 have a function of decoding the information included in the acd file 62.

In the following, an application means an official application.

Next, acquisition of an activation key is described.

Figure 9:
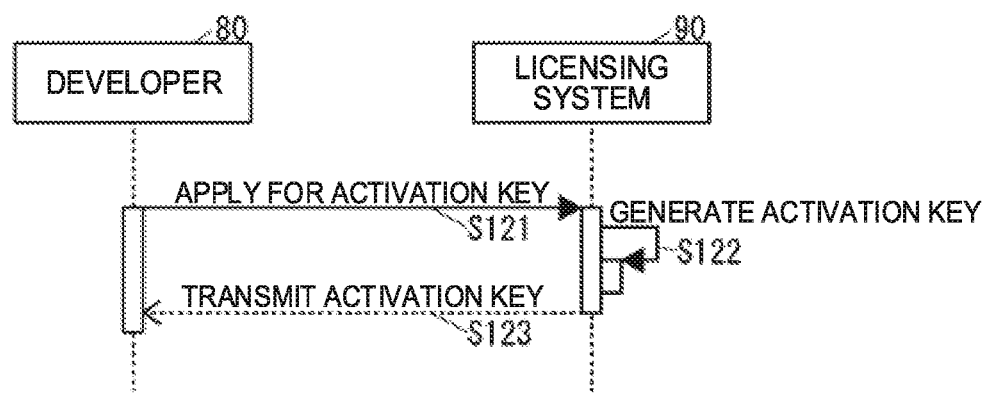
FIG. 9 is a sequence diagram when an activation key, which is information for activation of the application shown in FIG. 2, is acquired by a developer.

FIG. 9 is a sequence diagram when an activation key, which is information for activation of an application, is acquired by the developer 80.

When the developer 80 wishes to operate an application on an image forming apparatus, whose serial number is not included in activation information of the application, as shown in FIG. 9, the developer 80 applies, to the licensing system 90, for an activation key for the image forming apparatus, for which the developer 80 wishes to operate the application, by using a computer (not shown) (S121). The application in S121 includes the application ID of the application, and the serial number of the image forming apparatus for which the developer 80 wishes to operate the application. The application in S121 may include a plurality of serial numbers.

Upon receiving the application in S121, the licensing system 90 generates the activation key applied in S121 (S122). The activation key is, for example, information of 20 digits, which is generated for each image forming apparatus according to a specific rule, based on the application ID included in the application in S121, and the serial number included in the application in S121.

After the processing in S122, the licensing system 90 transmits the activation key generated in S122 to the developer 80 (S123).

Thus, the developer 80 acquires an activation key by receiving the activation key transmitted from the licensing system 90 in S123 by a computer (not shown).

Next, an operation of the image forming system 10 is described.

First, an operation of the image forming system 10 when installation of an application for the image forming apparatus 20 is instructed by the user is described. Note that a case where installation of an application for the image forming apparatus 20 is instructed by the user is described. However, a case where installation of an application for an image forming apparatus other than the image forming apparatus 20 is instructed by the user is also similar to the above.

Figure 10:
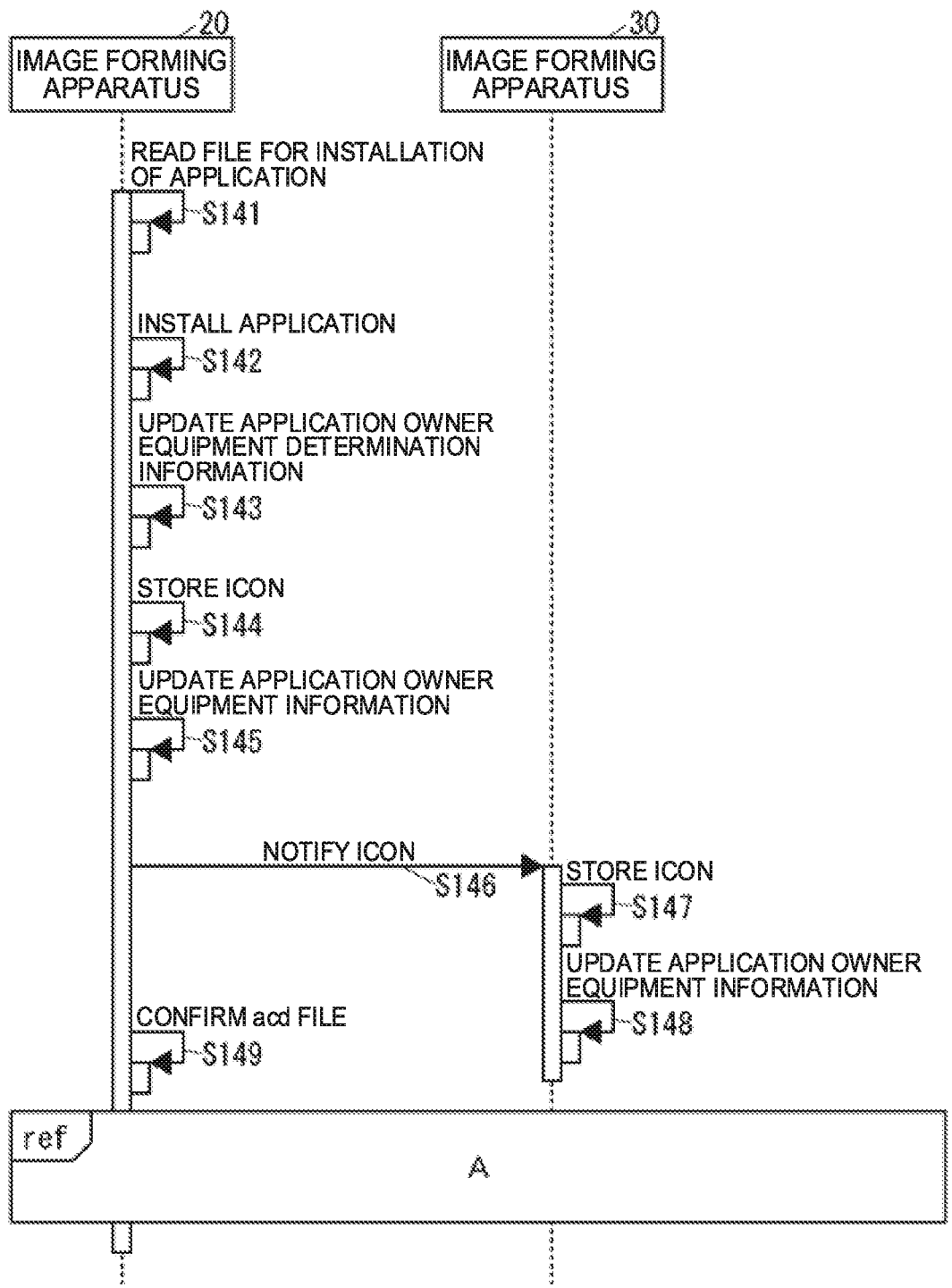
FIG. 10 is a sequence diagram of an operation of the image forming system shown in FIG. 1 when installation of an application for an image forming apparatus is instructed by the user.
Figure 11:
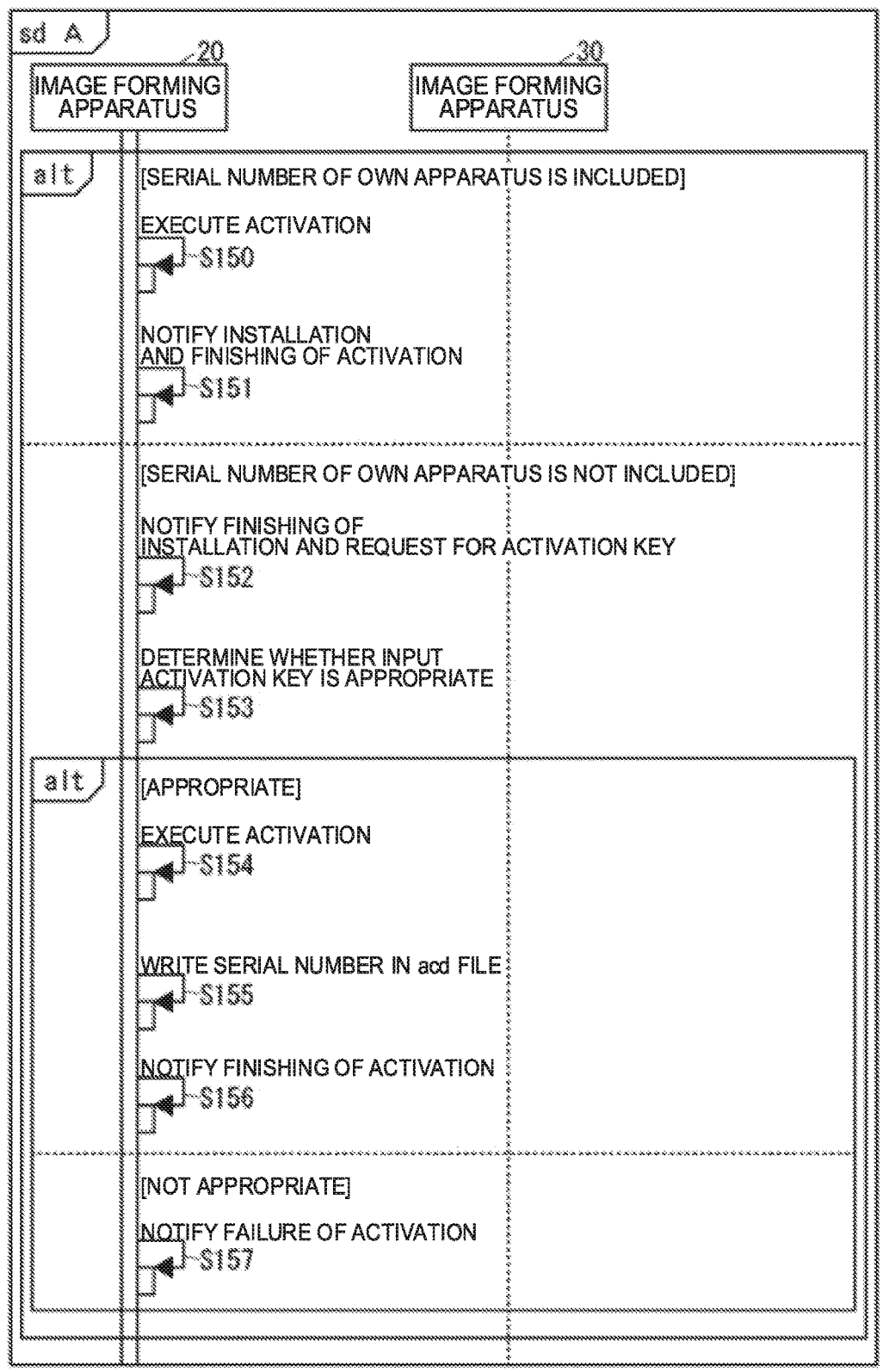
FIG. 11 is a sequence diagram of "A" shown in FIG. 10.

FIG. 10 is a sequence diagram of an operation of the image forming system 10 when installation of an application for the image forming apparatus 20 is instructed by the user. FIG. 11 is a sequence diagram of "A" shown in FIG. 10.

In FIGS. 10 and 11, the image forming apparatus 30 is shown as one example of an image forming apparatus other than the image forming apparatus 20 in the image forming system 10. All the image forming apparatuses other than the image forming apparatus 20 in the image forming system 10 are operated in the same manner as the image forming apparatus 30.

For example, the user can instruct, the image forming apparatus 20 via the operation unit 21 or the communication unit 26 of the image forming apparatus 20 to install an application in a state that a storing medium such as a USB memory in which a file for installation of the application is written is connected to the image forming apparatus 20.

Upon receiving an instruction to install an application, as shown in FIGS. 10 and 11, the installation execution unit 28a of the image forming apparatus 20 reads, from the storing medium, a file for installation of the application in response to the instruction to install the application (S141).

Next, the installation execution unit 28a installs the application by using the file read in S141 (S142). Thus, the application is stored in the storage unit 27.

After the processing in S142, the installation execution unit 28a updates the application owner equipment determination information 27i regarding the application installed in S142 (S143). Specifically, the installation execution unit 28a stores, in the application owner equipment determination information 27i, a memory remaining amount after the installation in S142.

After the processing in S143, the installation execution unit 28a stores the icon of the application installed in S142 in the icon storage folder 27e (S144).

Next, the installation execution unit 28a updates the application owner equipment information 27g to indicate that the image forming apparatus that owns the application installed in S142 is the image forming apparatus 20 (S145). Specifically, the installation execution unit 28a writes, in the application owner equipment information 27g, the application ID of the application installed in S142, the serial number of the image forming apparatus 20, and the icon ID of the icon stored in the icon storage folder 27e in S144 in association with one another.

After the processing in S145, the installation execution unit 28a notifies all the image forming apparatuses connected by grid computing, of the icon of the application installed in S142 (S146). This notification includes the serial number of the image forming apparatus 20, and the application ID of the application installed in S142.

Upon receiving the notification in S146, the installation execution unit of the image forming apparatus 30 stores the icon notified in S146 in the icon storage folder of the image forming apparatus 30 (S147).

Next, the installation execution unit of the image forming apparatus 30 updates the application owner equipment information of the image forming apparatus 30 to indicate that the image forming apparatus that owns the application associated with the icon stored in the icon storing folder in S147 is the image forming apparatus 20 (S148). Specifically, the installation execution unit of the image forming apparatus 30 writes, in the application owner equipment information of the image forming apparatus 30, the application ID, the serial number, and the icon ID, which are included in the notification in S146 in association with one another.

After the processing in S146, the activation execution unit 28b of the image forming apparatus 20 confirms whether the serial number of the image forming apparatus 20 itself is included in the acd file of the application installed in S142 (S149).

When the activation execution unit 28b confirms in S149 that the serial number of the image forming apparatus 20 itself is included in the acd file of the application installed in S142, the activation execution unit 28b executes activation of the application installed in S142 (S150).

After the processing in S150, the activation execution unit 28b notifies installation of the application and finishing of activation via the display unit 22 or the communication unit 26 of the image forming apparatus 20 (S151).

When the activation execution unit 28b confirms in S149 that the serial number of the image forming apparatus 20 itself is not included in the acd file being the file read in S141, the activation execution unit 28b notifies finishing of installation of the application, and a request for an activation key for the application via the display unit 22 or the communication unit 26 of the image forming apparatus 20 (S152).

Thus, the user can input the activation key requested in S152 via the operation unit 21 or the communication unit 26 of the image forming apparatus 20. When the user is not the developer 80, the user acquires the activation key from the developer 80.

After the processing in S152, when the activation key is input, the activation execution unit 28b of the image forming apparatus 20 determines whether the input activation key is appropriate (S153). Herein, the activation execution unit 28b determines that the input activation key is appropriate, when information generated according to a specific rule, based on the application ID of a target application, for which the activation key is requested in S152, and the serial number of the image forming apparatus 20 itself matches the input activation key. On the other hand, the activation execution unit 28b determines that the input activation key is not appropriate, when information generated according to a specific rule, based on the application ID of a target application, for which the activation key is requested in S152, and the serial number of the image forming apparatus 20 itself does not match the input activation key.

When the activation execution unit 28b determines in S153 that the input activation key is appropriate, the activation execution unit 28b executes activation of the application installed in S142 (S154).

After the processing in S154, the activation execution unit 28b writes the serial number of the image forming apparatus 20 in the acd file of the application (S155). Herein, the activation execution unit 28b also increases the number of machines in the acd file of the application by one.

After the processing in S155, the activation execution unit 28b notifies finishing of activation of the application via the display unit 22 or the communication unit 26 of the image forming apparatus 20 (S156). Thus, the user of the image forming apparatus 20 can recognize that the target application can be used in the image forming apparatus 20.

When the activation execution unit 28b determines in S153 that the input activation key is not appropriate, the activation execution unit 28b notifies failure of activation via the display unit 22 or the communication unit 26 of the image forming apparatus 20 (S157). Thus, the user of the image forming apparatus 20 can recognize that the target application cannot be used in the image forming apparatus 20.

Next, an operation of the image forming apparatus 20 when the user logs in is described. Note that a case where the user logs in the image forming apparatus 20 is described. However, a case where the user logs in an image forming apparatus other than the image forming apparatus 20 is also similar to the above.

Figure 12:
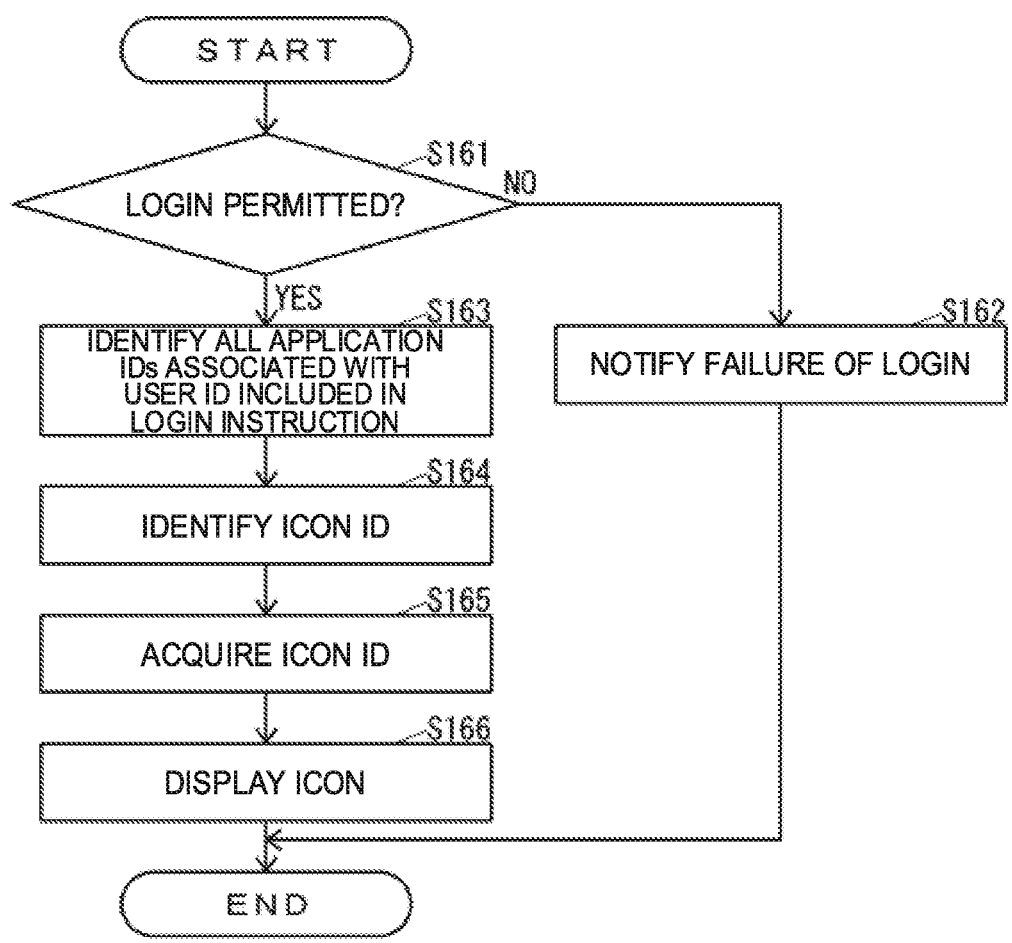

FIG. 12 is a flowchart of an operation of the image forming apparatus 20 when the user logs in.

As shown in FIG. 12, upon receiving an instruction to log in by the user via the operation unit 21 of the image forming apparatus 20, the login processing unit 28c of the image forming apparatus 20 determines whether the instructed login is permitted (S161). Herein, when combination of the user ID and authentication information included in the login instruction is included in the login information 27b, the login processing unit 28c determines that login is permitted. On the other hand, when combination of the user ID and authentication information included in the login instruction is not included in the login information 27b, the login processing unit 28c determines that login is not permitted.

When the login processing unit 28c determines in S161 that login is not permitted, the login processing unit 28c notifies failure of login via the display unit 22 of the image forming apparatus 20 (S162), and the operation shown in FIG. 12 is finished.

When the login processing unit 28c determines in S161 that login is permitted, the login processing unit 28c identifies all the application IDs associated with the user ID included in the login instruction in the user-associated application information 27h (S163).

Next, the login processing unit 28c identifies the icon ID associated with each of all the application IDs identified in S163 in the application owner equipment information 27g (S164).

Next, the login processing unit 28c acquires, from the icon storage folder 27e, an icon having each of all the icon IDs identified in S163 (S165).

Next, the login processing unit 28c displays all the icons acquired in S165 on the display unit 22 of the image forming apparatus 20 (S166), and the operation shown in FIG. 12 is finished.

Next, an operation of the image forming system 10 when an icon displayed on the display unit 22 of the image forming apparatus 20 is clicked is described. Note that a case where an icon displayed on the display unit 22 of the image forming apparatus 20 is clicked is described. However, a case where an icon displayed on a display unit of an image forming apparatus other than the image forming apparatus 20 is clicked is also similar to the above.

Figure 13:
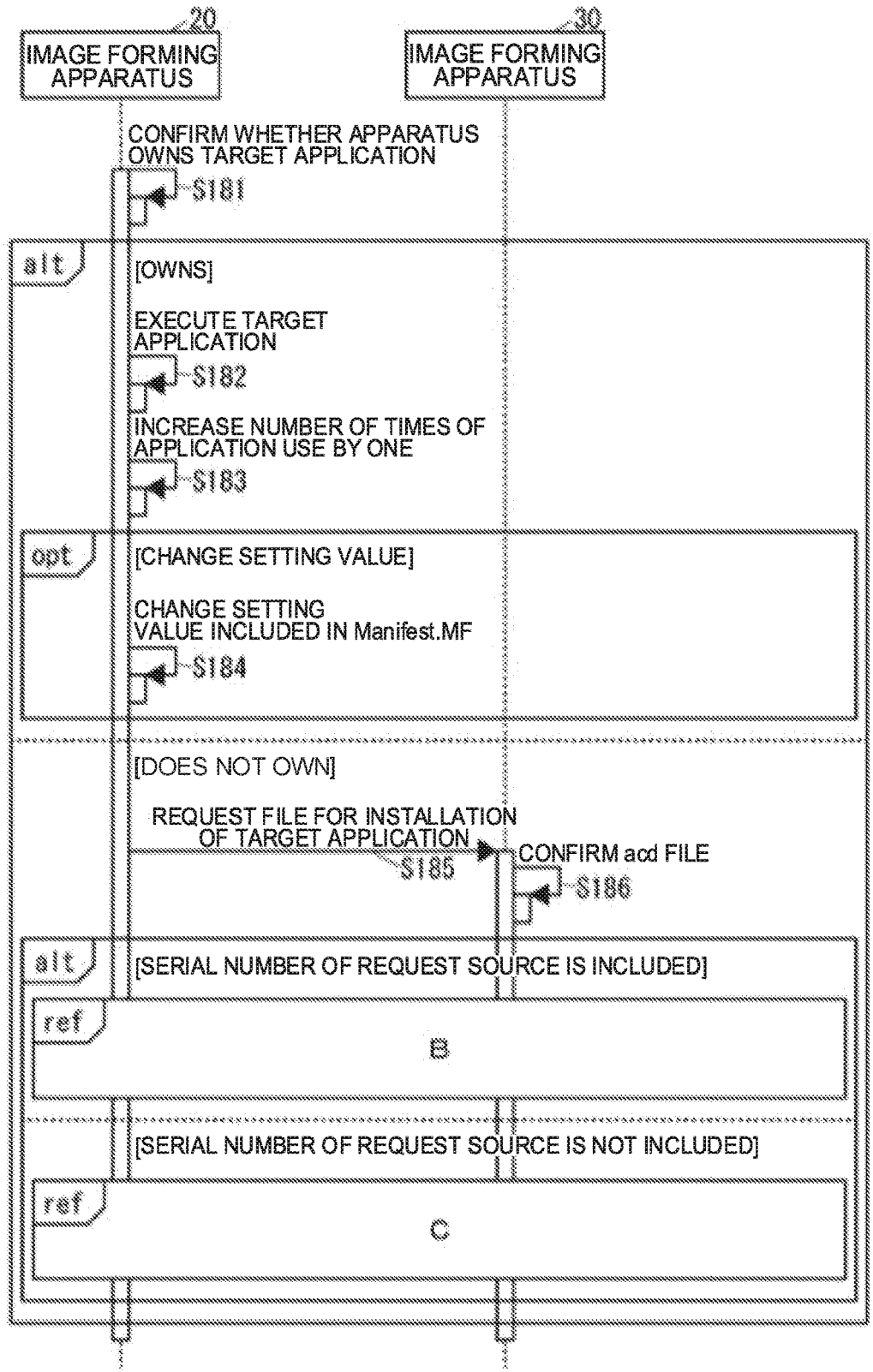
FIG. 13 is a sequence diagram of an operation of the image forming system shown in FIG. 1 when an icon displayed on a display unit of an image forming apparatus is clicked.
Figure 14:
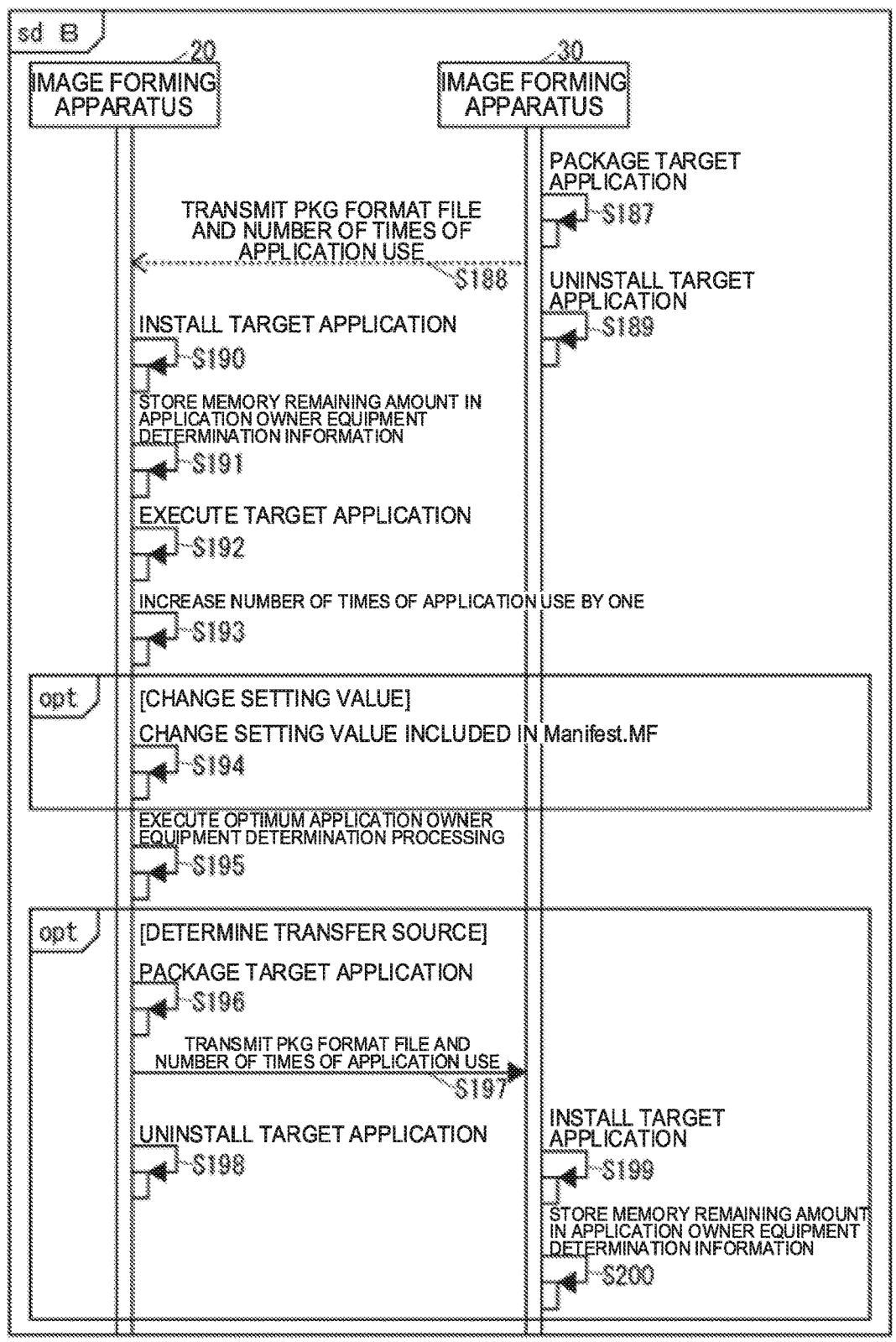
FIG. 14 is a sequence diagram of "B" shown in FIG. 13.
Figure 15:
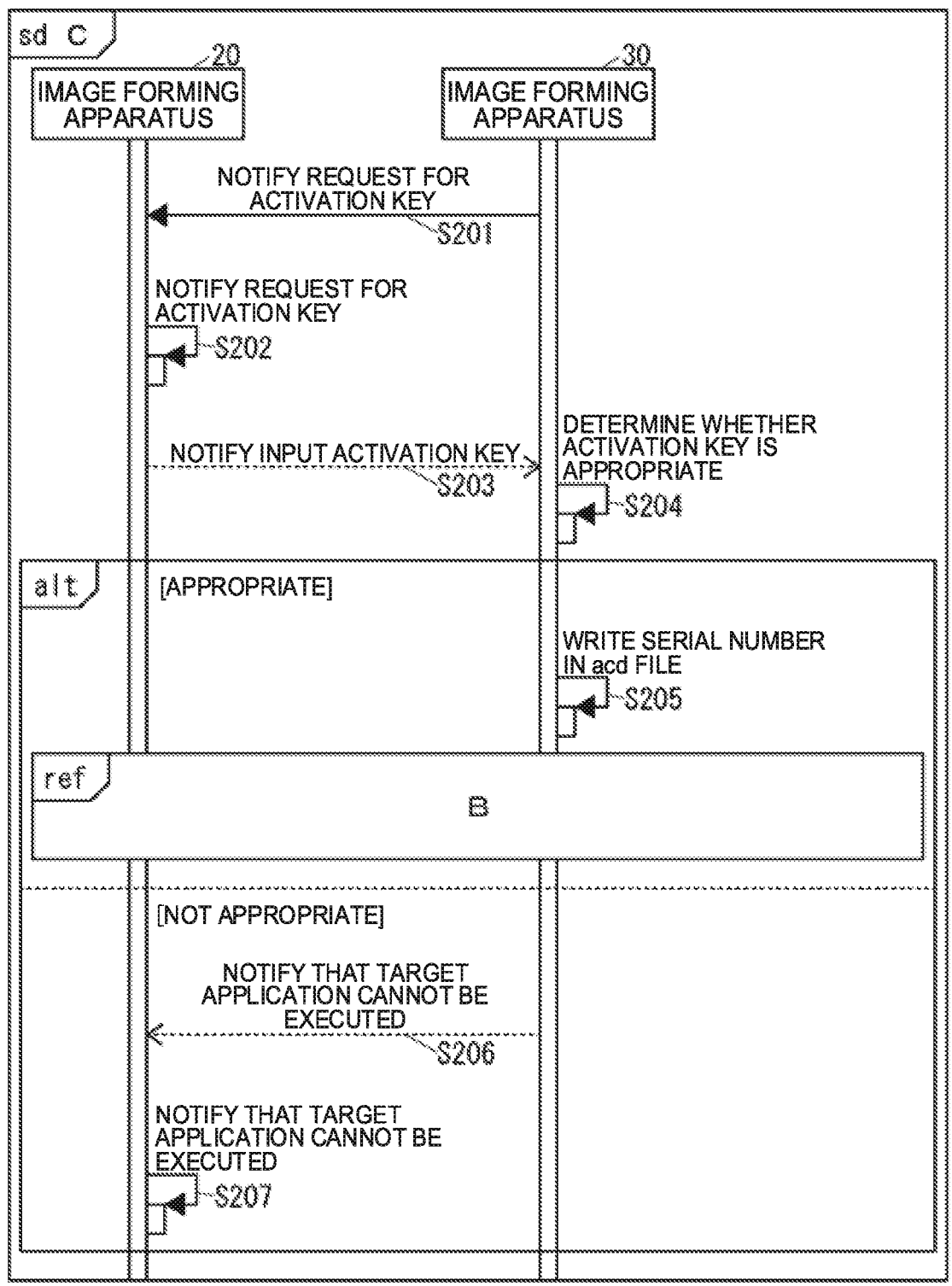
FIG. 15 is a sequence diagram of "C" shown in FIG. 13.

FIG. 13 is a sequence diagram of an operation of the image forming system 10 when an icon displayed on the display unit 22 of the image forming apparatus 20 is clicked. FIG. 14 is a sequence diagram of "B" shown in FIG. 13. FIG. 15 is a sequence diagram of "C" shown in FIG. 13.

As shown in FIGS. 13 to 15, the application execution unit 28d of the image forming apparatus 20 confirms whether the image forming apparatus 20 itself owns an application (hereinafter, referred to as a "target application" in the description with reference to FIGS. 13 to 15) having an application ID associated with an icon ID of a clicked icon (hereinafter, referred to as a "target icon" in the description with reference to FIGS. 13 to 15) in the application owner equipment information 27g (S181). Herein, the application execution unit 28d determines that the image forming apparatus 20 itself owns the target application, when the image forming apparatus (hereinafter, referred to as a "target image forming apparatus" in the description with reference to FIGS. 13 to 15) associated with the icon ID of the target icon in the application owner equipment information 27g is the image forming apparatus 20 itself. On the other hand, the application execution unit 28d determines that the image forming apparatus 20 itself does not own the target application, when the target image forming apparatus is not the image forming apparatus 20 itself.

When the application execution unit 28d confirms in S181 that the image forming apparatus 20 itself owns the target application, the application execution unit 28d executes the target application (S182).

After the processing in S182, the installation execution unit 28a increases the number of times of application use of the target application by one in the application owner equipment determination information 27i (S183).

After the processing in S183, when the setting value of the target application is changed, the application execution unit 28d changes the setting value in the application setting data included in Manifest.MF of the target application (S184), the processing in S184 is executed each time the setting value of the target application is changed.

When the installation execution unit 28a confirms in S181 that the image forming apparatus 20 itself does not own the target application, the installation execution unit 28a requests the target image forming apparatus for a file for installation of the target application (S185). The request in S185 includes the serial number of the image forming apparatus 20, and the application ID of the target application. Hereinafter, description is made based on a premise that the target image forming apparatus is the image forming apparatus 30.

Upon receiving the request in S185, the file transmission unit of the image forming apparatus 30 confirms whether the serial number of the image forming apparatus 20, which is a request source in S185, is included in the acd file of the target application requested in S185 (S186).

When the file transmission unit of the image forming apparatus 30 determines in S186 that the serial number of the image forming apparatus 20 is included in the acd file, the file transmission unit packages the target application into a PKG format file that can be installed in the image forming apparatus (S187).

Figure 16:
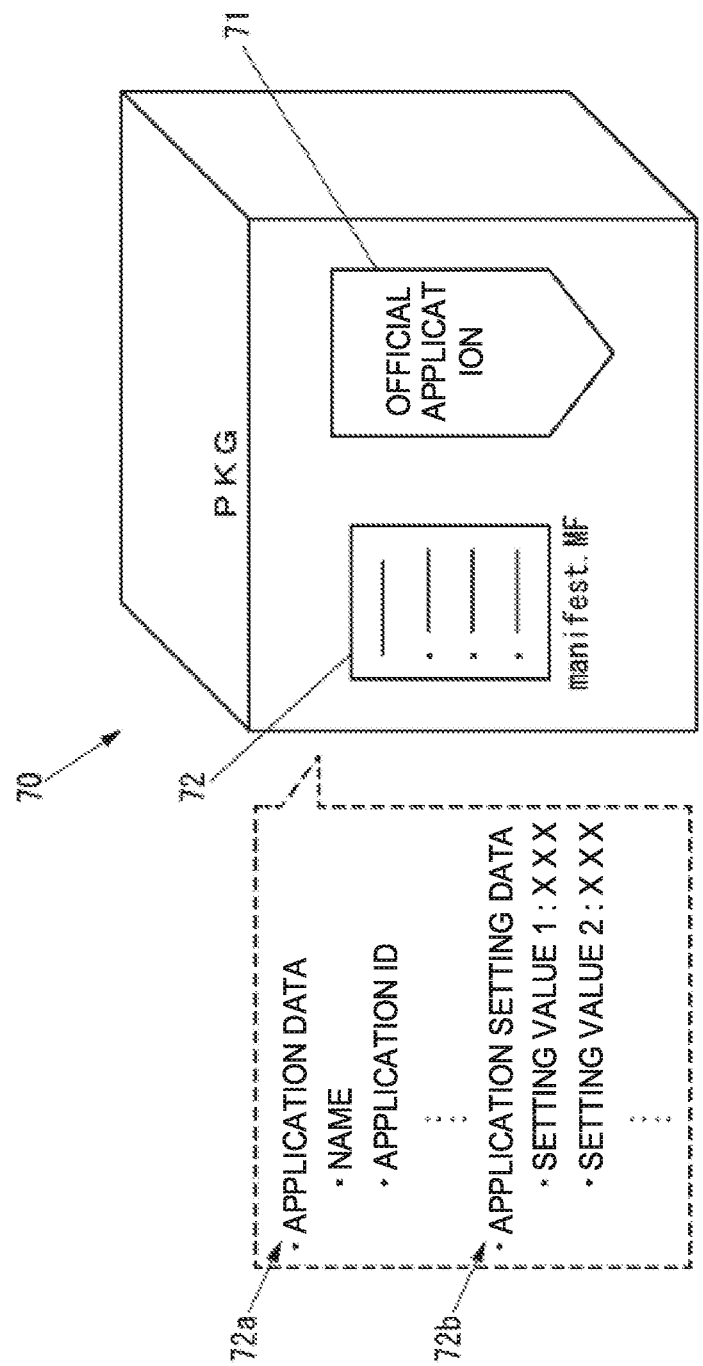
FIG. 16 is a diagram showing one example of a PKG format file packaged in the operations shown in FIGS. 13 to 15.

FIG. 16 is a diagram showing one example of a PKG format file 70 packaged in S187.

The PKG format file 70 shown in FIG. 16 includes an execution file 71 of an application, and Manifest.MF 72 of the application. The Manifest.MF 72 includes application data 72a, which indicate information such as the name and the application ID of the application, and application setting data 72b, which indicate various setting values of the application.

As shown in FIGS. 13 to 15, after the processing in S187, the file transmission unit of the image forming apparatus 30 transmits, to the image forming apparatus 20, which is a request source in S185, the PKG format file packaged in S187, and the number of times of application use associated with a target application in the application owner equipment determination information of the image forming apparatus 30 (S188).

When the processing in S188 is finished, the installation execution unit of the image forming apparatus 30 uninstalls the target application from the image forming apparatus 30 (S189).

Upon receiving the PKG format file transmitted in S188, the installation execution unit 28a of the image forming apparatus 20 installs the target application by using the received PKG format file (S190). Herein, the installation execution unit 28a applies the setting value indicated in the application setting data included in the PKG format file.

After the processing in S190, the installation execution unit 28a stores, in the application owner equipment determination information 27i, the memory remaining amount after installation of the target application in S190 (S191).

After the processing in S191, the application execution unit 28d executes the target application (S192).

After the processing in S192, the installation execution unit 28a increases the number of times of application use of the target application by one in the application owner equipment determination information 27i (S193).

After the processing in S193, when the setting value of the target application is changed, the application execution unit 28d changes the setting value in the application setting data included in Manifest.MF of the target application (S194). The processing in S194 is executed each time the setting value of the target application is changed.

After the processing in S194, when execution of the target application is finished, the installation execution unit 28a executes optimum application owner equipment determination processing of determining an image forming apparatus that should own the target application (S195).

Figure 17:
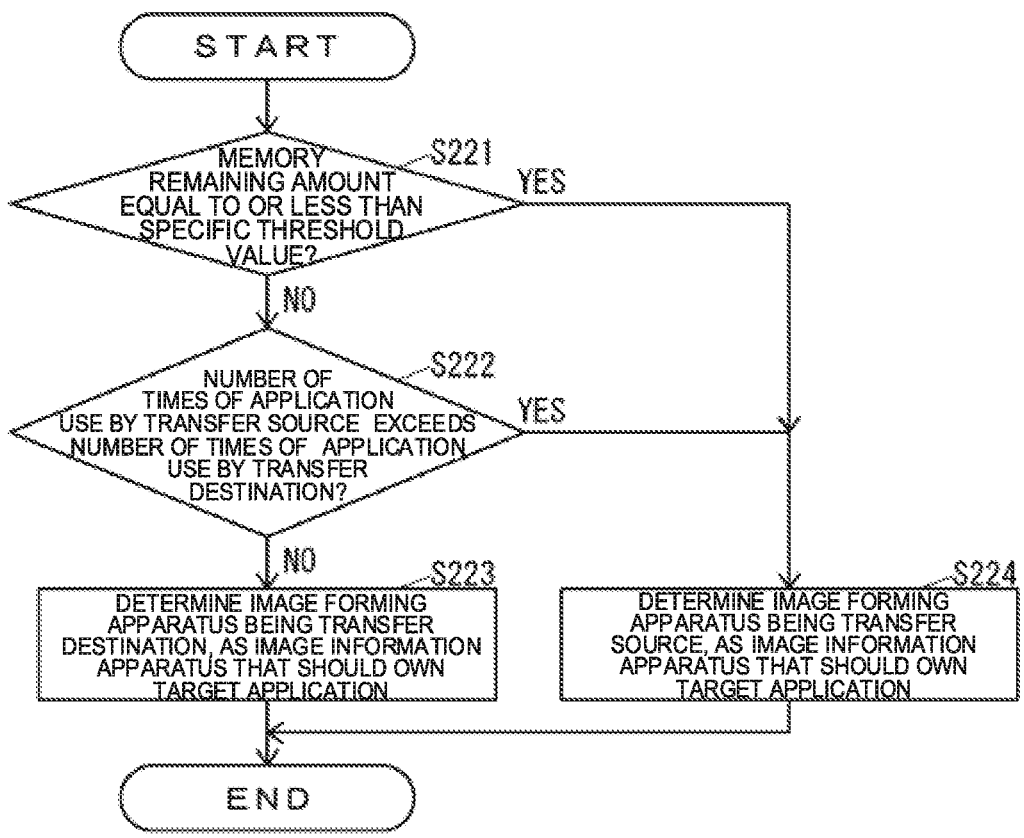
FIG. 17 is a flowchart of optimum application owner equipment determination processing shown in FIGS. 13 to 15.

FIG. 17 is a flowchart of the optimum application owner equipment determination processing shown in FIGS. 13 to 15.

As shown in FIG. 17, the installation execution unit 28a of the image forming apparatus 20 determines whether the memory remaining amount associated with the target application in the application owner equipment determination information 27i is equal to or less than a specific threshold value. (S221).

When the installation execution unit 28a determines in S221 that the memory remaining amount associated with the target application in the application owner equipment determination information 27i is more than the specific threshold value, the installation execution unit 28a determines whether the number of times of application use transmitted in S188, specifically, the number of times of application use of the target application in an image forming apparatus being a transfer source exceeds the number of times of application use associated with the target application in the application owner equipment determination information 27i, specifically, the number of times of application use of the target application in the image forming apparatus 20 being a transfer destination (S222).

When the installation execution unit 28a determines in S222 that the number of times of application use in the transfer source does not exceed the number of times of application use in the transfer destination, the installation execution unit 28a determines that the image forming apparatus that should own the target application is the image forming apparatus 20 being the transfer destination (S223), and the operation shown in FIG. 17 is finished.

The installation execution unit 28a determines in S221 that the memory remaining amount associated with the target application in the application owner equipment determination information 27i is equal to or less than the specific threshold value, or determines in S222 that the number of times of application use in the transfer source exceeds the number of times of application use in the transfer destination, the installation execution unit 28a determines that the image forming apparatus that should own the target application is the image forming apparatus being the transfer source (S224), and the operation shown in FIG. 17 is finished.

As shown in FIGS. 13 to 15, after the processing in S195, when the installation execution unit 28a determines in the processing in S195 that the image forming apparatus that should own the target application is the image forming apparatus being the transfer source, similarly to the processing in S187, the installation execution unit 28a packages the target application into a PKG format file that can be installed in the image forming apparatus (S196).

After the processing in S196, the file transmission unit 28e transmits, to the image forming apparatus 30, the PKG format file packaged in S196, and the number of times of application use associated with the target application in the application owner equipment determination information 27i (S197).

When the processing in S197 is finished, the installation execution unit 28a uninstalls the target application from the image forming apparatus 20 (S198).

Upon receiving the PKG format file transmitted in S197, the installation execution unit of the image forming apparatus 30 installs the target application by using the received PKG format file (S199). Herein, the installation execution unit of the image forming apparatus 30 applies the setting value indicated in the application setting data included in the PKG format file.

After the processing in S199, the installation execution unit of the image forming apparatus 30 stores, in the application owner equipment determination information of the image forming apparatus 30, the memory remaining amount after installation of the target application in S199 (S200).

When the activation execution unit of the image forming apparatus 30 determines in S186 that the serial number of the image forming apparatus 20 is not included in the acd file, the activation execution unit notifies the image forming apparatus 20, of a request for an activation key for the image forming apparatus 20 with respect to the target application (S201).

Then, the activation execution unit 28b of the image forming apparatus 20 notifies the request for the activation key for the image forming apparatus 20 with respect to the target application via the display unit 22 of the image forming apparatus 20 (S202).

Thus, the user can input the activation key requested in S202 via the operation unit 21 of the image forming apparatus 20. When the user is not the developer 80, the user acquires the activation key from the developer 80.

After the processing in S202, when the activation key is input, the activation execution unit 28b of the image forming apparatus 20 notifies the image forming apparatus 30, of the input activation key, and the serial number of the image forming apparatus 20 itself (S203).

Upon receiving the notification in S203, the activation execution unit of the image forming apparatus 30 determines whether the activation key notified in S203 is appropriate (S204). Herein, the activation execution unit of the image forming apparatus 30 notifies that the activation key notified in S203 is appropriate, when information generated according to a specific rule, based on the application ID of the target application, and the serial number of the image forming apparatus 20 notified in S203 matches the activation key notified in S203. On the other hand, the activation execution unit of the image forming apparatus 30 determines that the activation key notified in S203 is not appropriate, when information generated according to a specific rule, based on the application ID of the target application, and the serial number of the image forming apparatus 20 notified in S203 does not match the activation key notified in S203.

When the activation execution unit of the image forming apparatus 30 determines in S204 that the activation key notified in S203 is appropriate, the activation execution unit of the image forming apparatus 30 writes, in the acd file of the target application, the serial number of the image forming apparatus 20 (S205). Herein, the activation execution unit of the image forming apparatus 30 also increases the number of machines in the acd file of the target application by one.

After the processing in S205, the processing in S187 to S200 is executed.

When the activation execution unit of the image forming apparatus 30 determines in S204 that the activation key notified in S203 is not appropriate, the activation execution unit notifies the image forming apparatus 20 that the target application cannot be executed (S206).

Then, the activation execution unit 28b of the image forming apparatus 20 notifies via the display unit 22 of the image forming apparatus 20 that the target application cannot be executed (S207). Thus, the user of the image forming apparatus 20 can recognize that the target application cannot be executed in the image forming apparatus 20.

Next, an operation of the image forming system 10 when uninstalling an application from the image forming apparatus 20 is instructed by the user is described. Note that a case where uninstalling an application from the image forming apparatus 20 is instructed by the user is described. However, a case where uninstalling an application from an image forming apparatus other than the image forming apparatus 20 is instructed by the user is also similar to the above.

Figure 18:
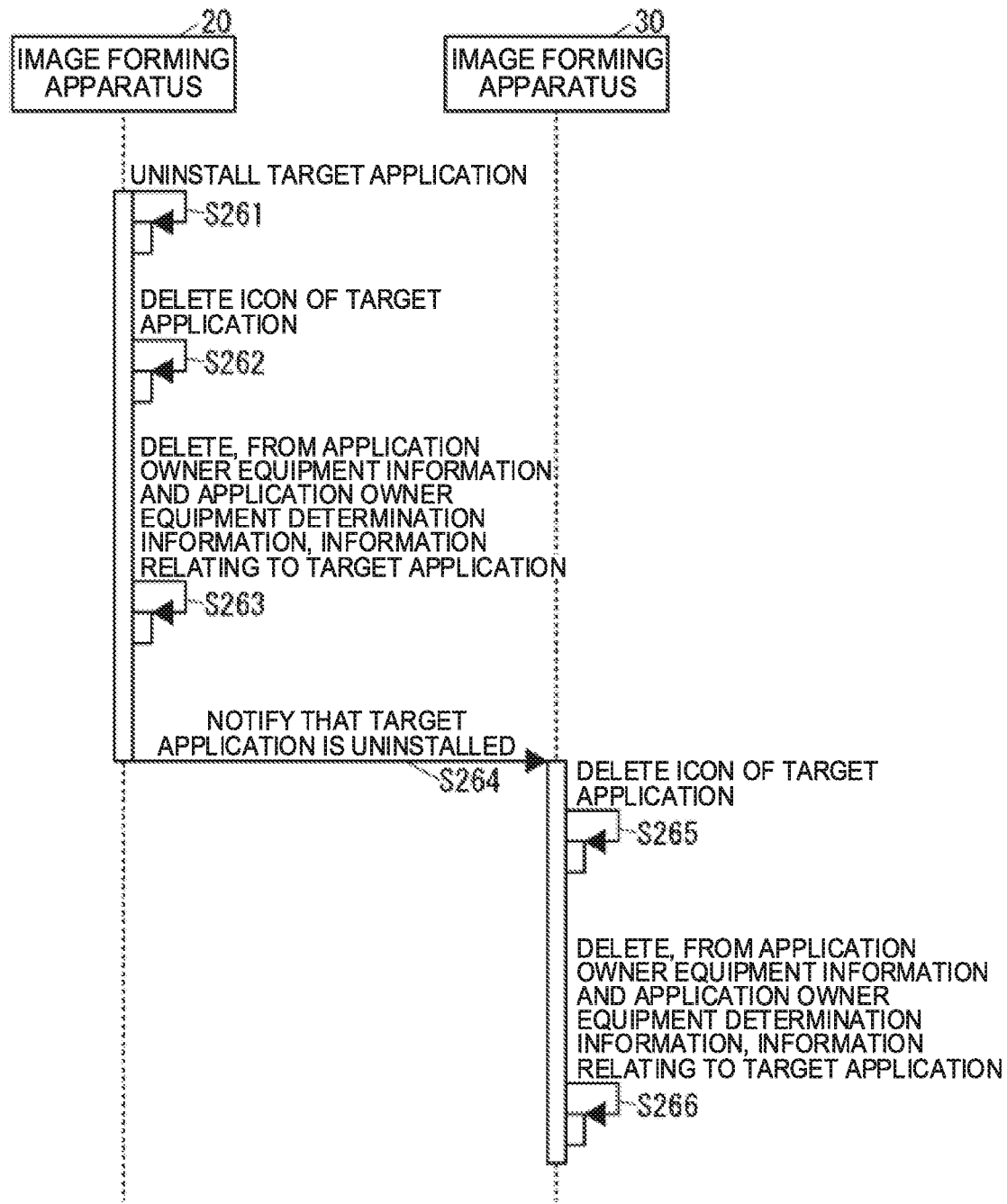
FIG. 18 is a sequence diagram of an operation of the image forming system shown in FIG. 1 when an uninstallation of an application from an image forming apparatus is instructed by the user.

FIG. 18 is a sequence diagram of an operation of the image forming system 10 when uninstalling an application from the image forming apparatus 20 is instructed by the user.

In FIG. 18, the image forming apparatus 30 is shown as one example of an image forming apparatus other than the image forming apparatus 20 in the image forming system 10. All the image forming apparatuses other than the image forming apparatus 20 in the image forming system 10 are operated in the same manner as the image forming apparatus 30.

For example, the user can instruct the image forming apparatus 20 via the operation unit 21 or the communication unit 26 of the image forming apparatus 20 to uninstall an application.

Upon receiving an instruction to uninstall an application, the installation execution unit 28a of the image forming apparatus 20 uninstalls the target application from the image forming apparatus 20, as shown in FIG. 18 (S261).

After the processing in S261, the installation execution unit 28a deletes the icon of the target application from the icon storage folder 27e (S262).

After the processing in S262, the installation execution unit 28a deletes, from the application owner equipment information 27g and the application owner equipment determination information 27i, information relating to the target application (S263).

After the processing in S263, the installation execution unit 28a notifies all image forming apparatuses connected by grid computing that the target application is uninstalled (S264). This notification includes the serial number of the image forming apparatus 20, and the application ID and the icon ID of the target application.

Upon receiving the notification in S264, the installation execution unit of the image forming apparatus 30 deletes, from the icon storage folder of the image forming apparatus 30, the icon having the icon ID notified in S264, specifically, the icon of the target application (S265).

After the processing in S265, the installation execution unit of the image forming apparatus 30 deletes, from the application owner equipment information and the application owner equipment determination information of the image forming apparatus 30, information relating to the target application (S266).

As described above, when execution of an application in an image forming apparatus is finished, the image forming system 10 causes one of the image forming apparatus, and the transfer source of the application that satisfies a specific condition relating to use of the application to own the application (S221 to S224). Therefore, it is possible to reduce frequent installation of an application, and as a result, improve the performance of the image forming apparatus.

When execution of an application is finished in an image forming apparatus, the image forming system 10 causes one of the image forming apparatus, and the transfer source of the application in which frequency of use of the application is highest, specifically, the image forming apparatus in which the number of times of use is largest, to own the application. Therefore, it is possible to advantageously reduce frequent installation of an application, and as a result, improve the performance of the image forming apparatus.

In the present embodiment, the image forming system 10 determines an image forming apparatus that owns an application, based on the number of times of application use. Alternatively, the image forming system 10 may use frequency of use of an application other than the number of times of application use, instead of the number of times of application use, when determining the image forming apparatus that owns the application.

When determining the image forming apparatus that owns the application, the image forming system 10 may use the last date and time of use of the application, instead of frequency of use of the application. Specifically, the image forming system 10 may cause an image forming apparatus in which the last date and time of use of the application is most recent to own the application.

When an application is transferred from an image forming apparatus to another image forming apparatus, the image forming system 10 applies, to the application, a setting value notified from the image forming apparatus being a transfer source of the application to the image forming apparatus being a transfer destination in the image forming apparatus being the transfer destination (S190, S199). Therefore, even when the application is transferred, it is possible to take over the setting value of the application, and improve the usability.

The image forming system 10 causes an image forming apparatus, whose serial number is not included in an application, to operate the application by causing the image forming apparatus to execute activation of the application by an activation key (S154). Therefore, it is possible to use an application installed in any one of the image forming apparatuses only by the authorized image forming apparatus.

The image forming system 10 causes an image forming apparatus, whose serial number is included in an application, to operate the application, even when the image forming apparatus is not caused to execute activation of the application by an activation key (S150 and S192). Thus, it is possible to improve the convenience.

In the image forming system 10, when activation of an application by an activation key is executed for an image forming apparatus (S154 and S204), the serial number of the image forming apparatus is included in the application (S155 and S205). Therefore, the application is operated for an image forming apparatus in which activation by the activation key has been executed once, even when activation of the application is not executed again by the activation key. Thus, it is possible to improve the convenience.

In the image forming system 10, an image forming apparatus stores an icon of an application owned by another image forming apparatus, and an image forming apparatus that owns the application (S144 to S148). Therefore, when an icon of an application is displayed (S166), it is not necessary to access to another image forming apparatus. Thus, it is possible to shorten a time necessary for displaying the icon of the application.

Next, a modification example of the image forming system according to the above-described embodiment of the present disclosure is described. The image forming system according to the present modification example has the same configuration as the configuration shown in FIG. 1, but is different from the image forming system according to the above-described embodiment of the present disclosure in a point that the storage unit 27 further stores optimum application owner equipment information 27j indicating information of an image forming apparatus that should own an application in the block diagram of the image forming apparatus shown in FIG. 2. Hereinafter, a modified configuration by inclusion of the optimum application owner equipment information 27j is described in the configuration of the image forming system according to the above-described embodiment of the present disclosure described with reference to FIGS. 1 to 18. Description on a configurations that is not modified is omitted unless otherwise necessary for explanation.

Figure 19:
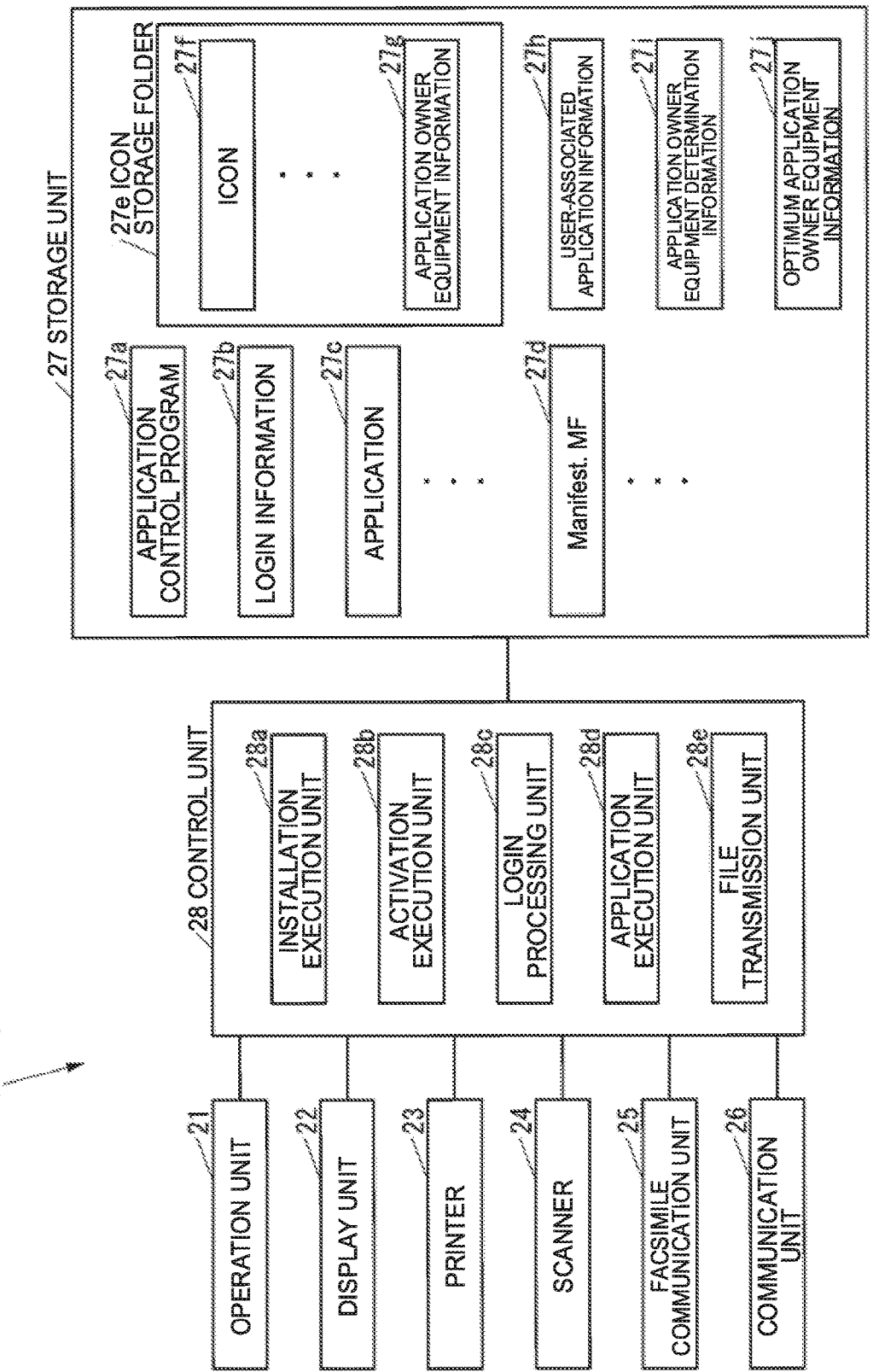
FIG. 19 is a block diagram of an image forming apparatus as an MFP device in a modification example of the image forming system according to the above-described embodiment.

FIG. 19 is a block diagram of an image forming apparatus according to the present modification example. As shown in FIG. 19, the storage unit 27 stores the optimum application owner equipment information 27j indicating information on the image forming apparatus that should own an application.

FIG. 20 is a diagram showing one example of the optimum application owner equipment information 27j.

As shown in FIG. 20, the optimum application owner equipment information 27j indicates the application ID of an application, the serial number of an image forming apparatus that should own the application, a memory remaining amount in the image forming apparatus after installation of the application, and the number of times of application use of the application in the image forming apparatus. The optimum application owner equipment information 27j includes only information relating to an application owned by the image forming apparatus 20.

Figure 21:
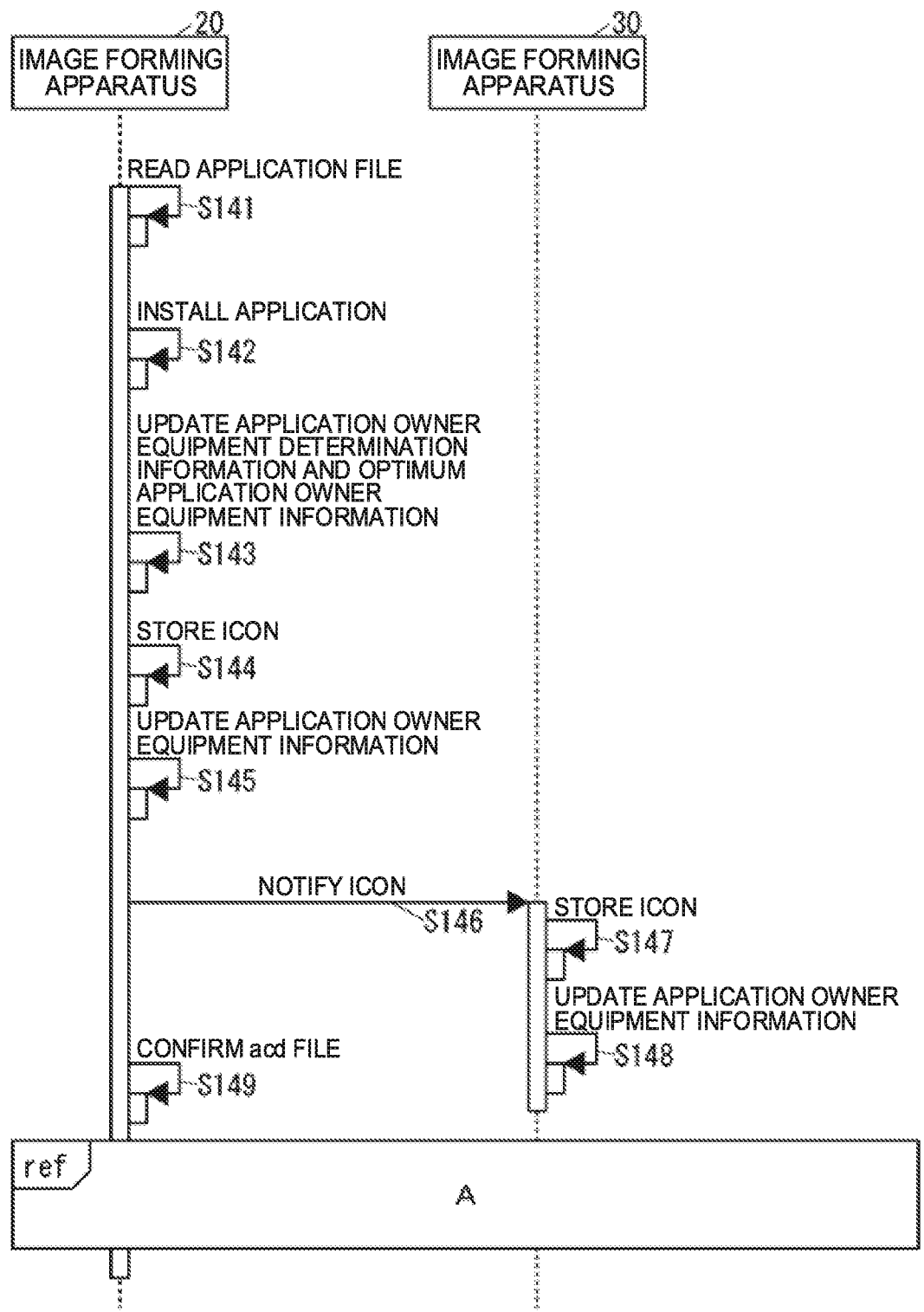
FIG. 21 is a sequence diagram of "A" shown in FIG. 10 in the above-described modification example.

As shown in FIG. 21, after the processing in S142, the optimum application owner equipment information 27j is updated together with the application owner equipment determination information 27i regarding the application installed in S142 by the installation execution unit 28a (S143). Specifically, the installation execution unit 28a stores, in the application owner equipment determination information 27i, the memory remaining amount after installation in S142, and stores, in the optimum application owner equipment information 27j, the serial number of the image forming apparatus 20, and the memory remaining amount after installation in S142, as the serial number and the memory remaining amount, which are associated with the application installed in S142.

Next, an operation of the image forming system 10 according to the present modification example when an icon displayed on the display unit 22 of the image forming apparatus 20 is clicked is described. Note that a case where an icon displayed on the display unit 22 of the image forming apparatus 20 is clicked is described. However, a case where an icon displayed on a display unit of an image forming apparatus other than the image forming apparatus 20 is clicked is also similar to the above.

Figure 22:
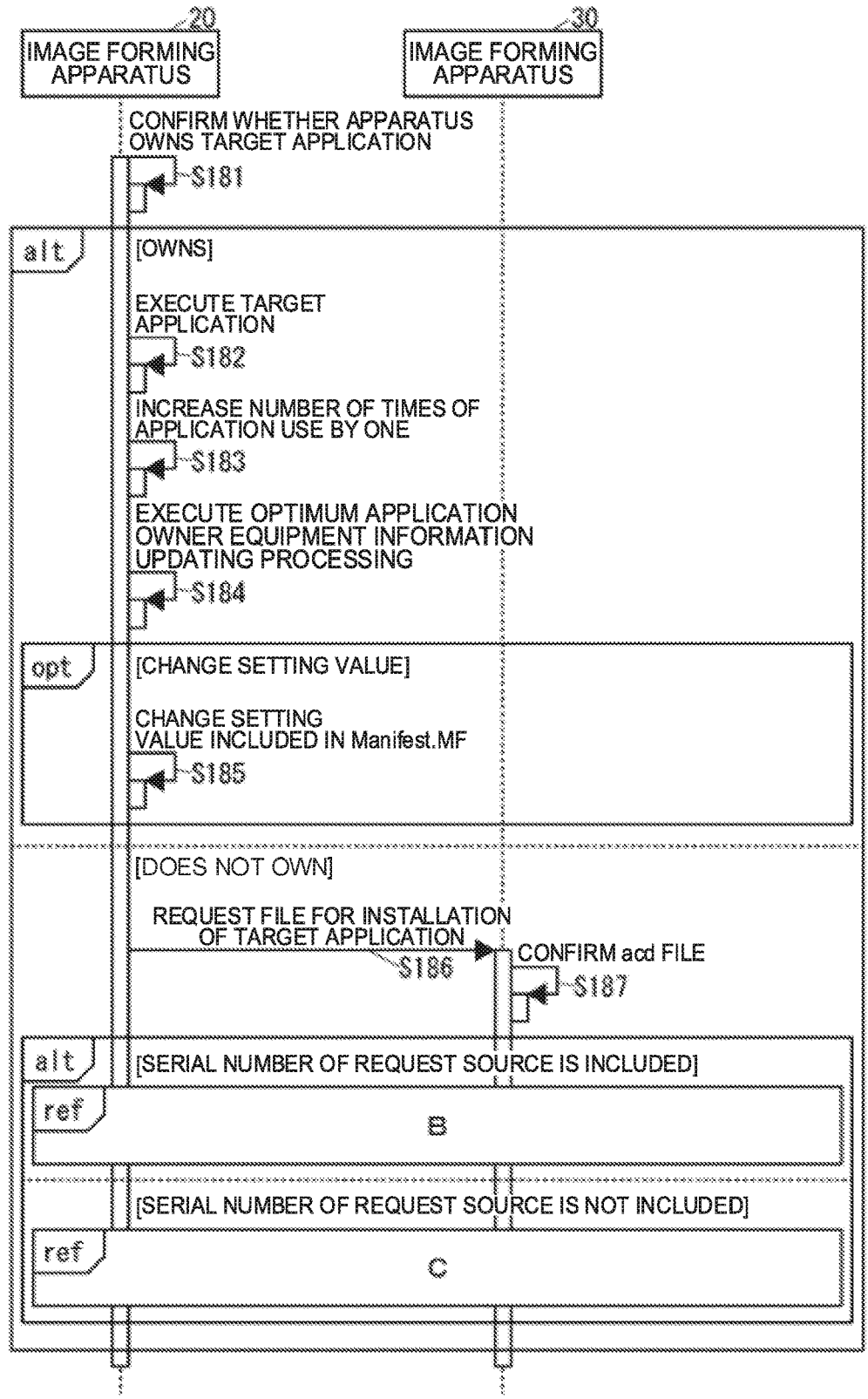
FIG. 22 is a sequence diagram of an operation of the image forming system when an icon displayed on a display unit of an image forming apparatus in the present modification example is clicked.
Figure 23:
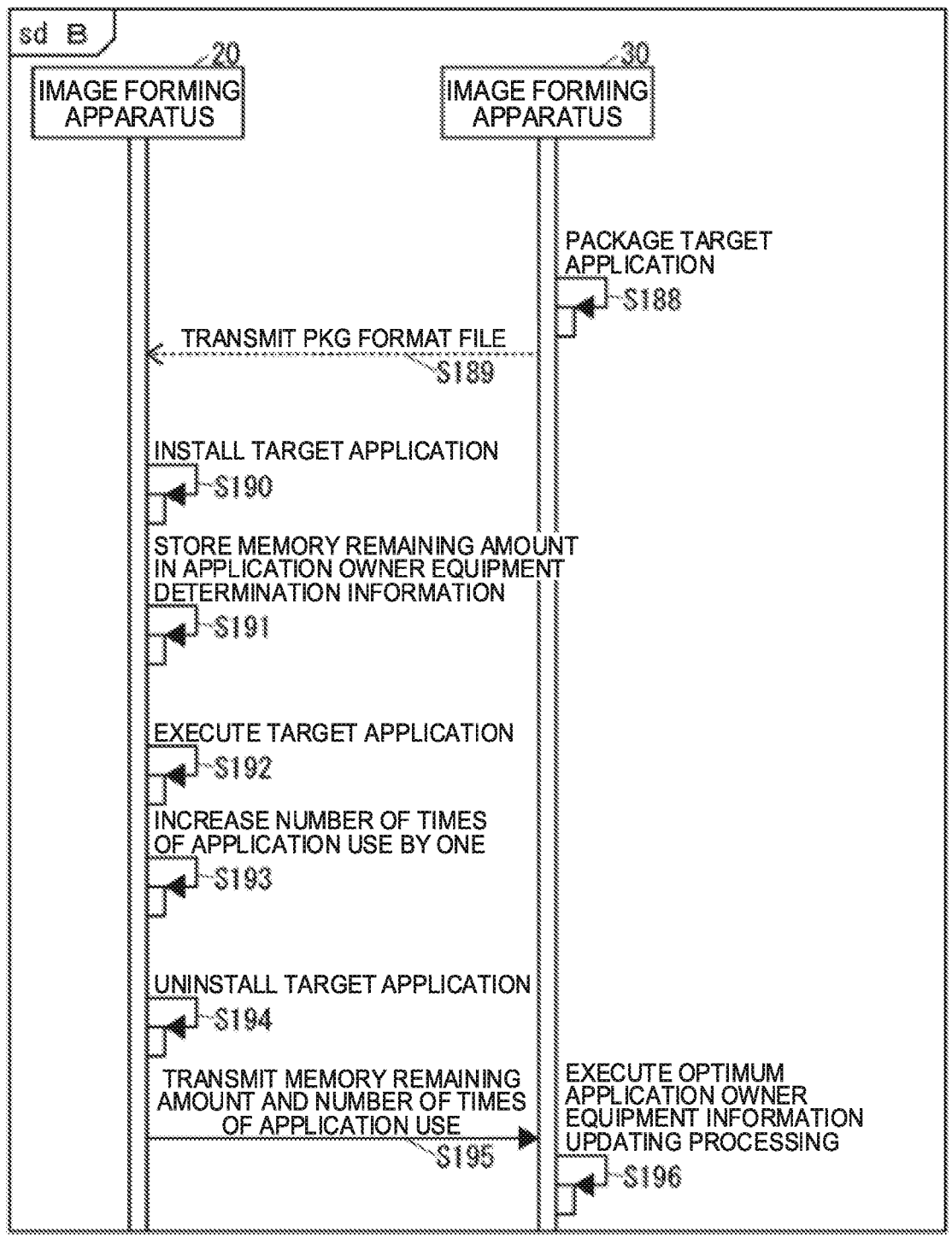
FIG. 23 is a sequence diagram of "B" shown in FIG. 22.
Figure 24:
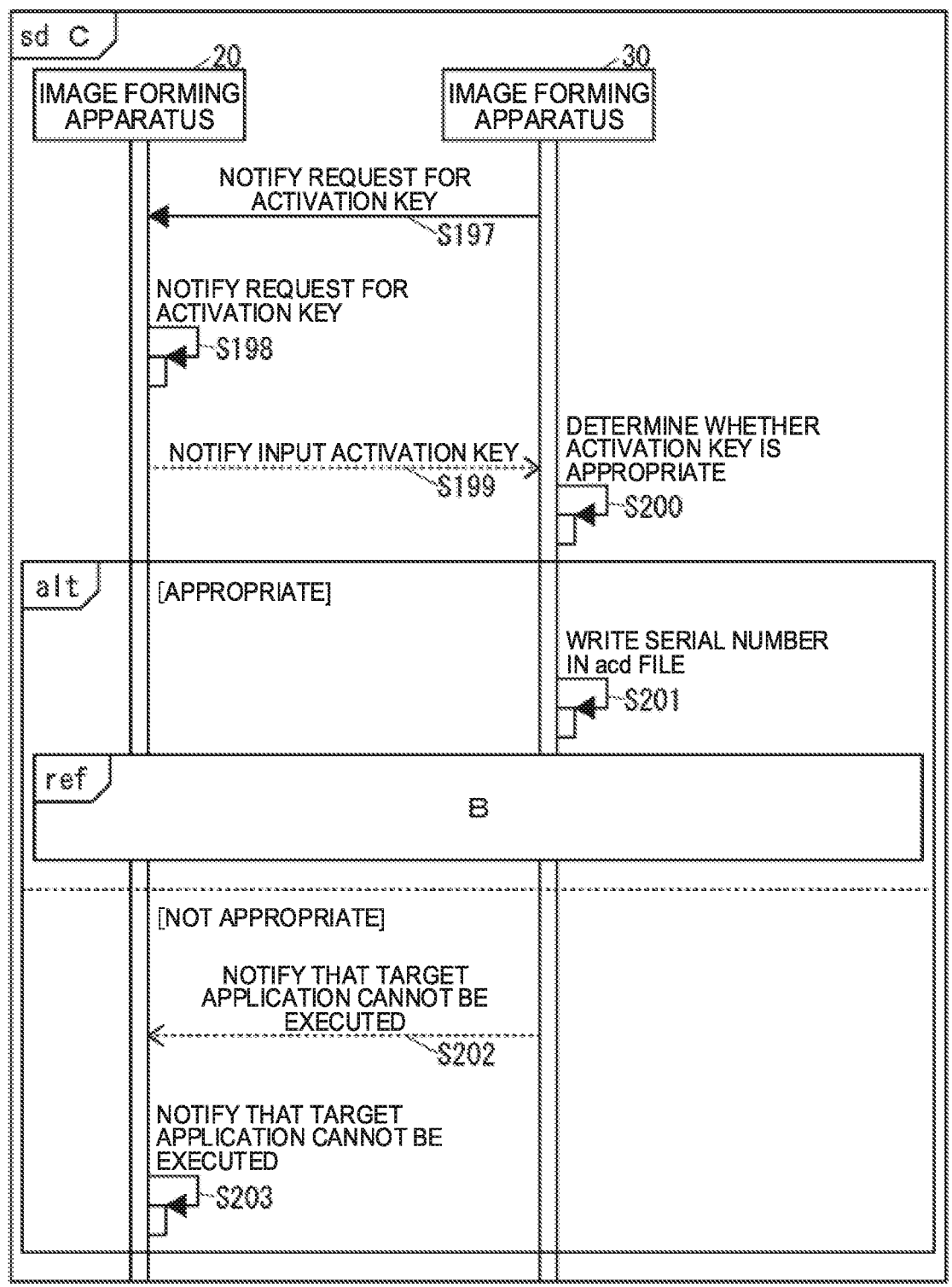
FIG. 24 is a sequence diagram of "C" shown in FIG. 22.

FIG. 22 is a sequence diagram of an operation of the image forming system 10 when an icon displayed on the display unit 22 of the image forming apparatus 20 according to the present modification example is clicked. FIG. 23 is a sequence diagram of "B" shown in FIG. 22. FIG. 24 is a sequence diagram of "C" shown in FIG. 22.

As shown in FIGS. 22 to 24, the application execution unit 28d of the image forming apparatus 20 according to the present modification example confirms whether the image forming apparatus 20 itself owns an application (hereinafter, referred to as a "target application" in the description with reference to FIGS. 22 to 24) having the application ID associated with the icon ID of a clicked icon (hereinafter, referred to as a "target icon" in the description with reference to FIGS. 22 to 24) in the application owner equipment information 27g (S181). Herein, the application execution unit 28d determines that the image forming apparatus 20 itself owns the target application, when the image forming apparatus (hereinafter, referred to as a "target image forming apparatus" in the description with reference to FIGS. 22 to 24) associated with the icon ID of the target icon in the application owner equipment information 27g is the image forming apparatus 20 itself. On the other hand, the application execution unit 28d determines that the image forming apparatus 20 itself does not own the target application, when the target image forming apparatus is not the image forming apparatus 20 itself.

When the application execution unit 28d confirms in S181 that the image forming apparatus 20 itself owns the target application, the application execution unit 28d executes the target application (S182).

After the processing in S182, the installation execution unit 28a increases the number of times of application use of the target application by one in the application owner equipment determination information 27i (S183).

After the processing in S183, the installation execution unit 28a executes optimum application owner equipment information updating processing to be described later for updating the optimum application owner equipment information 27j (S184).

After the processing in S184, when the setting value of the target application is changed, the application execution unit 28d changes the setting value in the application setting data included in Manifest.MF of the target application (S185). The processing in S185 is executed each time the setting value of the target application is changed.

When the installation execution unit 28a confirms in S181 that the image forming apparatus 20 itself does not own the target application, the installation execution unit 28a requests the target image forming apparatus for a file for installation of the target application (S186). The request in S186 includes the serial number of the image forming apparatus 20, and the application ID of the target application. Hereinafter, description is made based on a premise that the target image forming apparatus is the image forming apparatus 30.

Upon receiving the request in S186, the file transmission unit of the image forming apparatus 30 confirms whether the serial number of the image forming apparatus 20, which is the request source in S186, is included in the acd file of the target application requested in S186 (S187).

When the file transmission unit of the image forming apparatus 30 determines in S187 that the serial number of the image forming apparatus 20 is included in the acd file, the file transmission unit packages the target application into a PKG format file that can be installed in the image forming apparatus (S188). FIG. 16 shows one example of the packaged PKG format file in the above-described embodiment of the present disclosure.

As shown in FIGS. 22 to 24, after the processing in S188, the file transmission unit of the image forming apparatus 30 transmits the PKG format file packaged in S188 to the image forming apparatus 20, which is the request source in S186 (S189).

Upon receiving the PKG format file transmitted in S189, the installation execution unit 28a of the image forming apparatus 20 installs the target application by using the received PKG format file (S190). Herein, the installation execution unit 28a applies the setting value indicated in the application setting data included in the PKG format file.

After the processing in S190, the installation execution unit 28a stores, in the application owner equipment determination information 27i, the memory remaining amount after installation of the target application in S190 (S191).

After the processing in S191, the application execution unit 28d executes the target application (S192).

After the processing in S192, the installation execution unit 28a increases the number of times of application use of the target application by one in the application owner equipment determination information 27i (S193).

After the processing in S193, when execution of the target application is finished, the installation execution unit 28a uninstalls the target application from the image forming apparatus 20 (S194).

The installation execution unit 28a transmits, to the image forming apparatus 30, the application ID of the target application, the serial number of the image forming apparatus 20 itself, and the memory remaining amount and the number of times of application use, which are associated with the target application in the application owner equipment determination information 27i (S195).

Upon receiving the information transmitted from the image forming apparatus 20 in S195, the installation execution unit of the image forming apparatus 30 executes the optimum application owner equipment information updating processing (S196).

When the activation execution unit of the image forming apparatus 30 determines in S187 that the serial number of the image forming apparatus 20 is not included in the acd file, the activation execution unit notifies the image forming apparatus 20, of a request for an activation key for the image forming apparatus 20 with respect to the target application (S197).

Then, the activation execution unit 28b of the image forming apparatus 20 notifies the request for the activation key for the image forming apparatus 20 with respect to the target application via the display unit 22 of the image forming apparatus 20 (S198).

Thus, the user can input the activation key requested in S198 via the operation unit 21 of the image forming apparatus 20. In a case where the user is not the developer 80, the user acquires the activation key from the developer 80.

After the processing in S198, when the activation key is input, the activation execution unit 28b of the image forming apparatus 20 notifies the image forming apparatus 20, of the input activation key, and the serial number of the image forming apparatus 30 itself (S199).

Upon receiving the notification in S199, the activation execution unit of the image forming apparatus 30 determines whether the activation key notified in S199 is appropriate (S200). Herein, the activation execution unit of the image forming apparatus 30 determines that the activation key notified in S199 is appropriate, when information generated according to a specific rule, based on the application ID of the target application, and the serial number of the image forming apparatus 20 notified in S199 matches the activation key notified in S199. On the other hand, the activation execution unit of the image forming apparatus 30 determines that the activation key notified in S199 is not appropriate, when information generated according to a specific rule, based on the application ID of the target application, and the serial number of the image forming apparatus 20 notified in S199 does not match the activation key notified in S199.

When the activation execution unit of the image forming apparatus 30 determines in S200 that the activation key notified in S199 is appropriate, the activation execution unit writes the serial number of the image forming apparatus 20 in the acd file of the target application (S201). Herein, the activation execution unit of the image forming apparatus 30 also increases the number of machines in the acd file of the target application by one.

After the processing in S201, the processing in S188 to S196 is executed.

When the activation execution unit of the image forming apparatus 30 determines in S200 that the activation key notified in S199 is not appropriate, the activation execution unit notifies the image forming apparatus 20 that the target application cannot be executed (S202).

Then, the activation execution unit 28b of the image forming apparatus 20 notifies via the display unit 22 of the image forming apparatus 20 that the target application cannot be executed (S203). Thus, the user of the image forming apparatus 20 can recognize that the target application cannot be executed in the image forming apparatus 20.

Figure 25:
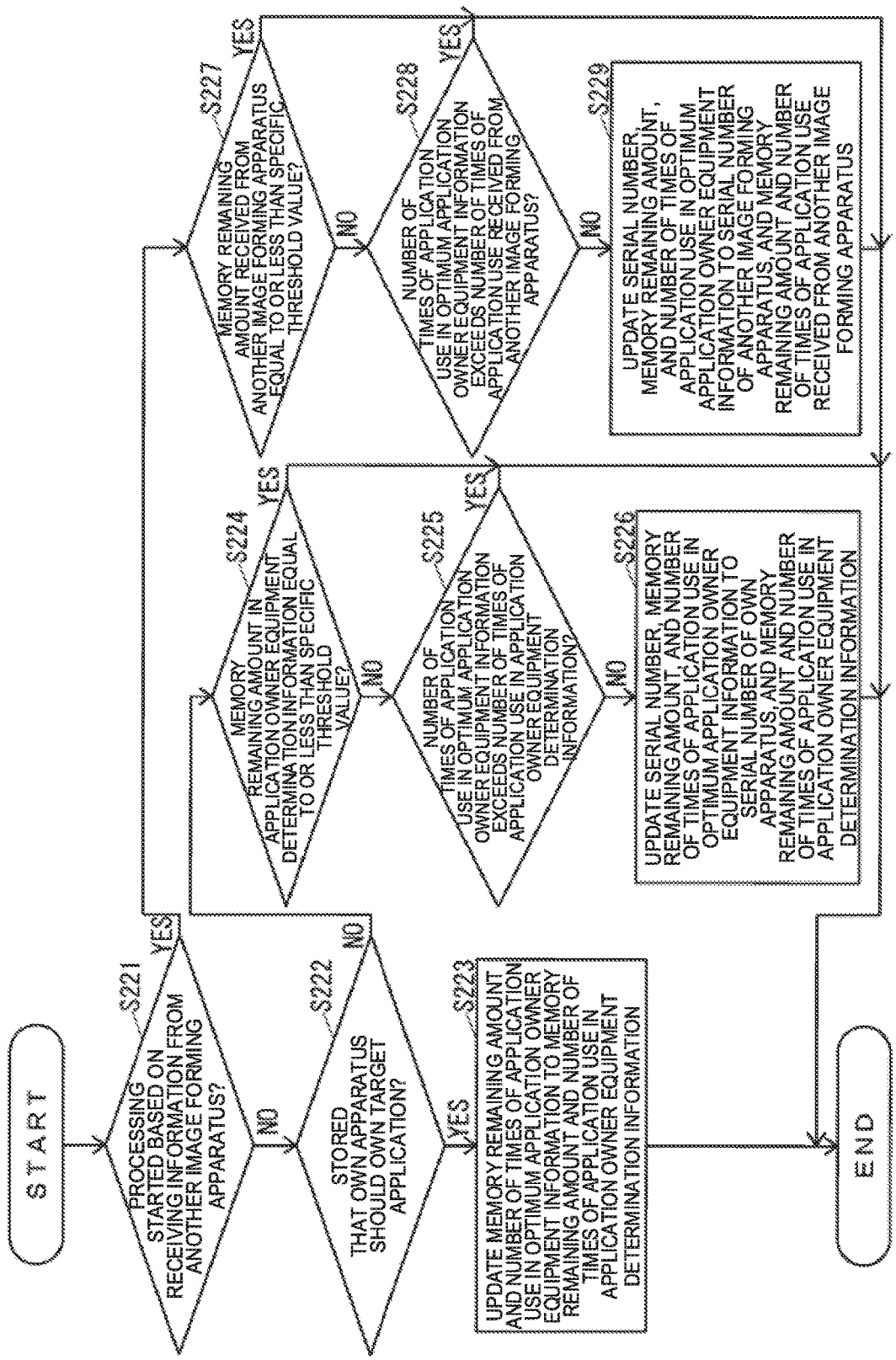
FIG. 25 is a flowchart of optimum application owner equipment information updating processing shown in FIGS. 22 to 24.

FIG. 25 is a flowchart of the optimum application owner equipment information updating processing shown in FIGS. 22 to 24. Hereinafter, a case is described in which the optimum application owner equipment information updating processing is executed in the image forming apparatus 20 of the image forming system according to the present modification example. However, a case where the optimum application owner equipment information updating processing is executed in an image forming apparatus other than the image forming apparatus 20 is also similar to the above.

As shown in FIG. 25, the installation execution unit 28a of the image forming apparatus 20 according to the present modification example determines whether the optimum application owner equipment information updating processing is started by receiving information from another image forming apparatus (hereinafter, in the description on the operation shown in FIG. 25, an image forming apparatus that transmits information, based on which the optimum application owner equipment information updating processing is started is simply referred to as "another image forming apparatus" (S221). When the installation execution unit 28a starts the optimum application owner equipment information updating processing by the processing similar to the processing in S184, the installation execution unit 28a determines that the optimum application owner equipment information updating processing is not started by receiving information from another image forming apparatus. On the other hand, when the optimum application owner equipment information updating processing is started by the processing similar to the processing in S196, the installation execution unit 28a determines that the optimum application owner equipment information updating processing is started by receiving information from another image forming apparatus.

When the installation execution unit 28a determines in S221 that the optimum application owner equipment information updating processing is not started by receiving information from another image forming apparatus, the installation execution unit 28a determines whether it is stored that the image forming apparatus 20 itself should own the target application (S222). Herein, the installation execution unit 28a determines that it is stored that the image forming apparatus 20 itself should own the target application, when the image forming apparatus associated with the target application in the optimum application owner equipment information 27j is the image forming apparatus 20 itself. On the other hand, the installation execution unit 28a determines that it is not stored that the image forming apparatus 20 itself should own the target application, when the image forming apparatus associated with the target application in the optimum application owner equipment information 27j is not the image forming apparatus 20 itself.

When the installation execution unit 28a determines in S222 that it is stored that the image forming apparatus 20 itself should own the target application, the installation execution unit 28a updates the memory remaining amount and the number of times of application use, which are associated with the target application in the optimum application owner equipment information 27j, to the memory remaining amount and the number of times of application use, which are associated with the target application in the application owner equipment determination information 27i (S223), and the operation shown in FIG. 25 is finished.

When the installation execution unit 28a determines in S222 that it is not stored that the image forming apparatus 20 itself should own the target application, the installation execution unit 28a determines whether the memory remaining amount associated with the target application in the application owner equipment determination information 27i is equal to or less than a specific threshold value (S224).

When the installation execution unit 28a determines in S224 that the memory remaining amount associated with the target application in the application owner equipment determination information 27i is more than the specific threshold value, the installation execution unit 28a determines whether the number of times of application use associated with the target application in the optimum application owner equipment information 27j exceeds the number of times of application use associated with the target application in the application owner equipment determination information 27i (S225).

When the installation execution unit 28a determines in S225 that the number of times of application use associated with the target application in the optimum application owner equipment information 27j is equal to or less than the number of times of application use associated with the target application in the application owner equipment determination information 27i, the installation execution unit 28a updates the serial number, the memory remaining amount, and the number of times of application use, which are associated with the target application in the optimum application owner equipment information 27j, to the serial number of the image forming apparatus 20 itself, and memory remaining amount and the number of times of application use, which are associated with the target application in the application owner equipment determination information 27i (S226), and the operation shown in FIG. 25 is finished.

When the installation execution unit 28a determines in S221 that the optimum application owner equipment information updating processing is started by receiving information from another image forming apparatus, the installation execution unit 28a determines whether the memory remaining amount received from the another image forming apparatus is equal to or less than a specific threshold value (S227). The threshold value in S227 is the same value as the threshold value in S224.

When the installation execution unit 28a determines in S227 that the memory remaining amount received from the another image forming apparatus is more than the specific threshold value, the installation execution unit 28a determines whether the number of times of application use associated with the target application in the optimum application owner equipment information 27j exceeds the number of times application use received from the another image forming apparatus (S228).

When the installation execution unit 28a determines in S228 that the number of times of application use associated with the target application in the optimum application owner equipment information 27*j* does not exceed the number of times of application use received from the another image forming apparatus, the installation execution unit 28*a* updates the serial number, the memory remaining amount, and the number of times of application use, which are associated with the target application in the optimum application owner equipment information 27*j*, to the serial number of the another image forming apparatus, and the memory remaining amount and the number of times of application use, which are received from the another image forming apparatus (S229), and the operation shown in FIG. 25 is finished.

When the installation execution unit 28*a* determines in S224 that the memory remaining amount associated with the target application in the application owner equipment determination information 27*i* is equal to or less than a specific threshold value, or determines in S225 that the number of times of application use associated with the target application in the optimum application owner equipment information 27*j* exceeds the number of times of application use associated with the target application in the application owner equipment determination information 27*i*, or determines in S227 that the memory remaining amount received from another image forming apparatus is equal to or less than a specific threshold value, or determines in S228 that the number of times of application use associated with the target application in the optimum application owner equipment information 27*j* exceeds the number of times of application use received from another image forming apparatus, the operation shown in FIG. 25 is finished.

Next, an operation of the image forming system 10 according to the present modification example in a case where an image forming apparatus that owns an application is changed is described. In the following, a case where an image forming apparatus that owns a target application is the image forming apparatus 20 is described. However, a case where an image forming apparatus that owns a target application is an image forming apparatus other than the image forming apparatus 20 is also similar to the above.

Figure 26:
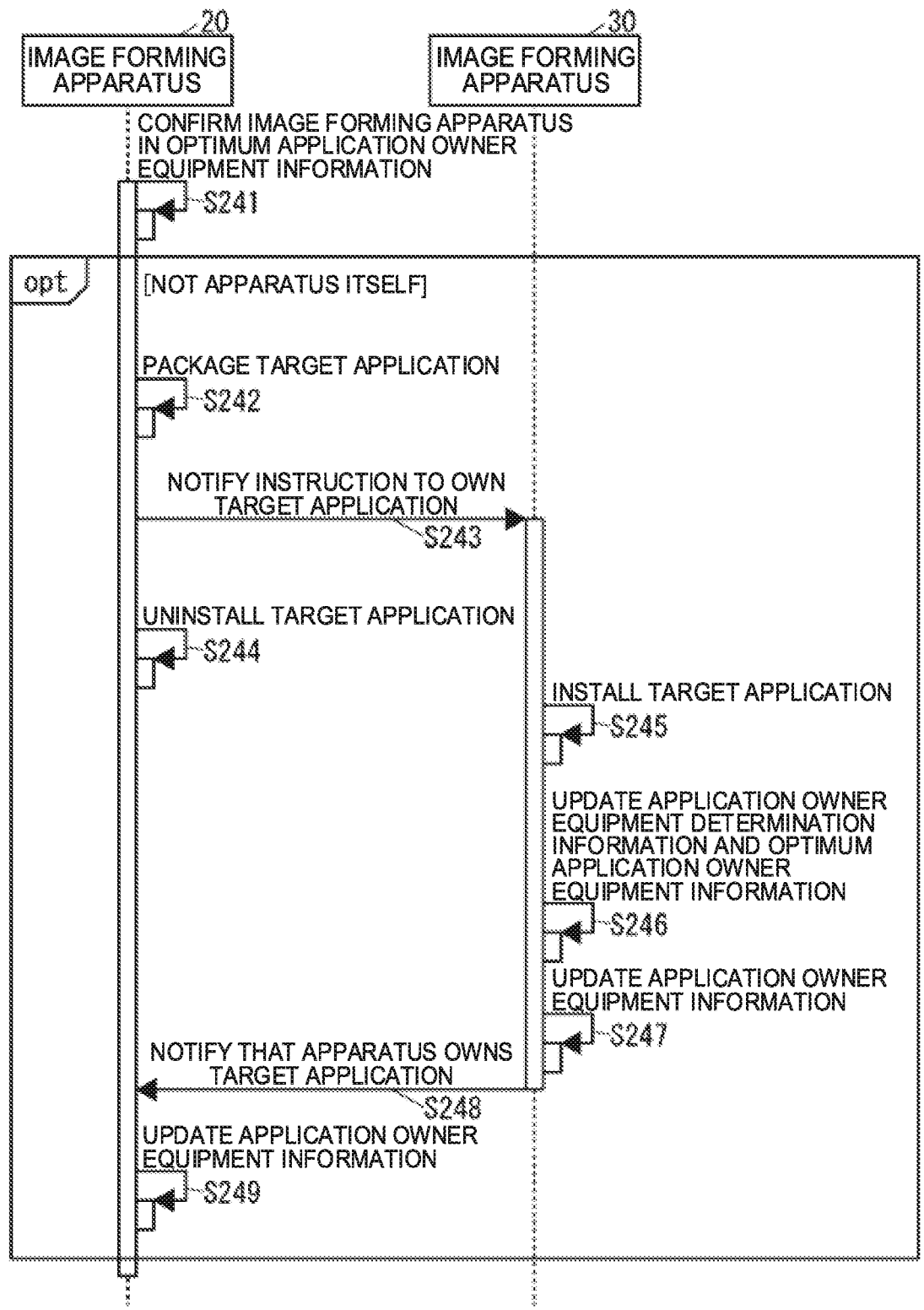
FIG. 26 is a sequence diagram of an operation of the image forming system when an image forming apparatus that owns an application in the above-described modification example is changed.

FIG. 26 is a sequence diagram of an operation of the image forming system 10 according to the present modification example when an image forming apparatus that owns an application is changed.

The file transmission unit 28*e* of the image forming apparatus 20 executes the operation shown in FIG. 26 for each application associated with the image forming apparatus 20 itself in the application owner equipment information 27*g*.

The timing of executing the operation shown in FIG. 26 is a timing at which a target application for the operation shown in FIG. 26 is not executed by any one of the image forming apparatuses.

For example, the file transmission unit 28*e* may execute the operation shown in FIG. 26 after confirming that the target application is not executed by any one of the image forming apparatuses in response to an instruction via the operation unit 21 or the communication unit 26.

In addition, the file transmission unit 28*e* can store a history such as an activation timing of the image forming apparatus 20, and a transition timing at which the image forming apparatus 20 shifts to a sleep mode, and learn a time zone in which the image forming apparatus 20 is highly unlikely to be used, specifically, a time zone in which the target application is highly unlikely to be executed in the image forming apparatus 20, based on the history. Therefore, the file transmission unit 28*e* may automatically execute the operation shown in FIG. 26, after automatically confirming that the target application is not actually executed by any one of the image forming apparatuses in a time zone in which the image forming apparatus 20 is highly unlikely to be used.

As shown in FIG. 19, the file transmission unit 28*e* of the image forming apparatus 20 confirms an image forming apparatus associated with the target application in the optimum application owner equipment information 27*j* (S241).

When the file transmission unit 28*e* confirms in S241 that the image forming apparatus associated with the target application in the optimum application owner equipment information 27*j* is not the image forming apparatus 20, similarly to the processing in S188, the file transmission unit 28*e* packages the target application into a PKG format file that can be installed in the image forming apparatus (S242). Hereinafter, description is made based on a premise that an image forming apparatus associated with the target application in the optimum application owner equipment information 27*j* is the image forming apparatus 30.

After the processing in S242, the file transmission unit 28*e* notifies the image forming apparatus 30 associated with the target application in the optimum application owner equipment information 27*j*, of an instruction to own the target application (S243). The file transmission unit 28*e* includes the PKG format file packaged in S242 in the instruction.

When the processing in S243 is finished, the installation execution unit 28*a* uninstalls the target application from the image forming apparatus 20 (S244).

Upon receiving the instruction notified in S243, the installation execution unit of the image forming apparatus 30 installs the target application by using the PKG format file associated with the instruction (S245). Herein, the installation execution unit of the image forming apparatus 30 applies the setting value indicated in the application setting data included in the PKG format file.

After the processing in S245, the installation execution unit of the image forming apparatus 30 executes the processing in S246 similar to the processing in S143, and executes the processing in S247 similar to the processing in S145.

After the processing in S247, the installation execution unit of the image forming apparatus 30 notifies all the image forming apparatuses connected by grid computing that the image forming apparatus that owns the application installed in S245 is the image forming apparatus 30 (S248). This notification includes the serial number of the image forming apparatus 30, and the application ID of the application installed in S245. Hereinafter, the image forming apparatus 20 is described as an example of an image forming apparatus connected to the image forming apparatus 30 by grid computing.

Upon receiving the notification in S248, the installation execution unit 28*a* of the image forming apparatus 20 updates the application owner equipment information 27*g* to indicate that the image forming apparatus that owns the target application is the image forming apparatus 30 (S249), and the operation shown in FIG. 26 is finished.

When the file transmission unit 28*e* confirms in S241 that the image forming apparatus associated with the target application in the optimum application owner equipment information 27*j* is the image forming apparatus 20, the file transmission unit 28*e* does not execute anything, and the operation shown in FIG. 26 is finished.

As described above, the image forming system 10 according to the present modification example causes one of the image forming apparatuses that satisfies a specific condition relating to use of an application to own the application at a specific timing (S245). Therefore, it is possible to reduce frequent installation of the application, and as a result, improve the performance of the image forming apparatus.

The image forming system 10 according to the present modification example causes an image forming application in which frequency of use of an application is highest, specifically, the number of times of use is largest, to own the application. Therefore, it is possible to advantageously reduce frequent installation of an application, and as a result, improve the performance of the image forming apparatus.

The image forming system 10 according to the present modification example can advantageously reduce frequent installation of an application, even when causing an image forming apparatus in which the last date and time of use of the application is most recent to own the application, and as a result, improve the performance of the image forming apparatus.

Next, another embodiment according to the present disclosure is described. A configuration of an image forming system according to the present disclosure is also achieved by supplying, to a system or a device, a recording medium recording a software program code that achieves functions of the above-described embodiment according to the present disclosure, and causing a computer of the system or the device to read and execute the program code recorded on the recording medium. In this case, the program code itself read from the recording medium achieves the functions of the above-described embodiment, and the recording medium recording the program code constitutes the present disclosure. In addition, it is needless to say that not only functions of the above-described embodiment are achieved by causing a computer to execute a read program code, but also a case is included in which functions of the above-described embodiment are achieved by causing an operating system (OS) and the like operating on a computer to execute a part or all of actual processing, based on an instruction of the program code, and by performing the processing.

What is claimed is:

1. An image forming system provided with a plurality of image forming apparatuses including a first image forming apparatus and a second image forming apparatus, wherein
the first image forming apparatus installs therein an application owned by and transferred from the second image forming apparatus, and acquires, from the second image forming apparatus, use information indicating information relating to use of the application in the second image forming apparatus, and
when the first image forming apparatus finishes execution of the application, the first image forming apparatus determines which of the first image forming apparatus, and the second image forming apparatus satisfies a specific condition relating to use of the application, on the basis of the use information acquired from the second image forming apparatus, and transfers the application to the second image forming apparatus and thereafter uninstalls the application, in accordance with the first image forming apparatus determining that the second image forming apparatus satisfies the specific condition.

2. The image forming system according to claim 1, wherein
the specific condition includes a condition that frequency of use of the application is highest.

3. The image forming system according to claim 1, wherein
the first image forming apparatus also notifies the second image forming apparatus of a setting value of the application when the application is transferred to the second image forming apparatus, and
the second image forming apparatus applies, to the application, the setting value notified from the first image forming apparatus when the application is transferred from the first image forming apparatus.

4. The image forming system according to claim 1, wherein
the application includes identification information of an image forming apparatus, for which an operation of the application itself is permitted among the plurality of image forming apparatuses,
the image forming system causes an image forming apparatus whose identification information is not included in the application, to operate the application by causing the image forming apparatus to execute activation of the application by an activation key that is information for activation of the application, and
the image forming system causes the image forming apparatus whose identification information is included in the application, to operate the application, even when the image forming apparatus is not caused to execute activation of the application by the activation key.

5. The image forming system according to claim 4, wherein
the image forming system includes in the application, the identification information of the image forming apparatus when the image forming apparatus is caused to execute activation of the application by the activation key.

6. The image forming system according to claim 1, wherein
the first image forming apparatus stores an icon of the application owned by the second image forming apparatus, and the second image forming apparatus that owns the application.

7. The image forming system according to claim 1, wherein
the first image forming apparatus temporarily installs the application owned by the second image forming apparatus, and
the image forming system causes one of the plurality of image forming apparatuses that satisfies a specific condition relating to use of the application to own the application at a specific timing.

8. The image forming system according to claim 7, wherein
the specific condition includes a condition that a last date and time of use of the application is most recent.

9. An image forming apparatus of an image forming system including a plurality of image forming apparatuses comprising:
an installation execution unit that installs an application; and
a file transmission unit that transmits, to a first image forming apparatus of the image forming system, a file for installation of the application owned by the image forming apparatus itself, wherein
the file transmission unit transmits the file to the first image forming apparatus when the file is requested by the first image forming apparatus,
the installation execution unit uninstalls the application from the image forming apparatus after the file transmission unit transmits the file to the first image forming apparatus, the installation execution unit causes the image forming apparatus to own the application by installing the application with use of the file transmitted from a second image forming apparatus of the image forming system, when requesting the second image forming apparatus for the file, and acquires, from the second image forming apparatus, use information indicating information relating to use of the application in the image forming apparatus, and when the image forming apparatus finishes execution of the applications, the file transmission unit determines which of the image forming apparatus and the second image forming apparatus satisfies a specific condition relating to use of the application, on the basis of the use information acquired from the second image forming apparatus, and transmits, to the second image forming apparatus, the file for installation of the application, in accordance with the image forming apparatus determining that the second image forming apparatus satisfies the specific condition.

10. The image forming apparatus according to claim 9, wherein the installation execution unit temporarily installs the application by using the file transmitted from the second image forming apparatus when requesting the second image forming apparatus for the file, the installation execution unit notifies the second image forming apparatus, that owns the application, of use information indicating information relating to use of the application in the image forming apparatus, the file transmission unit determines one of the plurality of image forming apparatuses that satisfies a specific condition relating to use of the application, based on the use information at a specific timing, and notifies the one of the plurality of image forming apparatuses that satisfies the specific condition of an instruction to own the application, the instruction is associated with the file, the installation execution unit uninstalls, from the image forming apparatus, the application, being a target of the instruction, when the file transmission unit notifies the instruction, and the installation execution unit causes the image forming apparatus to own the application by installing the application with use of the file associated with the instruction, when receiving the instruction.

11. The image forming apparatus according to claim 9, wherein the application includes identification information of the image forming apparatus, for which an operation of the application itself is permitted among the plurality of the image forming apparatuses, the image forming apparatus further comprises an activation execution unit that causes the image forming apparatus to execute activation of the application by an activation key, being information for activation of the application, the file transmission unit transmits the file to the first image forming apparatus when the identification information of the first image forming apparatus is included in the application in a case where the file is requested by the first image forming apparatus, the installation execution unit installs the application by using the file transmitted from the second image forming apparatus when requesting the second image forming apparatus for the file, the activation execution unit causes the image forming apparatus to operate the application by causing the image forming apparatus to execute activation of the application by the activation key, when the identification information of the image forming apparatus is not included in the application, and the activation execution unit causes the image forming apparatus to operate the application, even when the image forming apparatus is not caused to execute activation of the application by the activation key, in a case where the installation execution unit installs the application by using the file transmitted from the second image forming apparatus.

12. A non-transitory computer-readable storing medium recording an application control program for an image forming apparatus of an image forming system including a plurality of image forming apparatuses, wherein the application control program causes the image forming apparatus to achieve an installation execution unit that installs an application, and a file transmission unit that transmits, to a first image forming apparatus of the image forming system, a file for installation of the application owned by the image forming apparatus, the file transmission unit transmits the file to the first image forming apparatus when the file is requested by the first image forming apparatus, the installation execution unit uninstalls the application from the image forming apparatus after the file transmission unit transmits the file to the first image forming apparatus, the installation execution unit causes the image forming apparatus to own the application by installing the application with use of the file transmitted from a second image forming apparatus of the image forming system when requesting the second image forming apparatus for the file, and acquires, from the second image forming apparatus, use information indicating information relating to use of the application in the image forming apparatus, and when the image forming apparatus finishes execution of the applications, the file transmission unit determines which of the first image forming apparatus that and the second image forming apparatus satisfies a specific condition relating to use of the application, on the basis of the use information acquired from the second image forming apparatus, and transmits, to the second image forming apparatus, the file for installation of the application, in accordance with the image forming apparatus determining that the second image forming apparatus satisfies the specific condition.

13. The non-transitory computer-readable storing medium according to claim 12, wherein in the application control program, the installation execution unit temporarily installs the application by using the file transmitted from the second image forming apparatus when requesting the second image forming apparatus for the file, the installation execution unit notifies the second image forming apparatus that owns the application of use information, indicating information relating to use of the application in the image forming apparatus, the file transmission unit determines one of the plurality of image forming apparatuses that satisfies a specific condition relating to use of the application, based on the use information at a specific timing, and notifies the one of the plurality of image forming apparatuses that satisfies the specific condition, of an instruction to own the application, the instruction is associated with the file, the installation execution unit uninstalls, from the image forming apparatus, the application, being a target of the instruction, when the file transmission unit notifies the instruction, and the installation execution unit causes the image forming apparatus provided with the installation execution unit itself to own the application by installing the application with use of the file associated with the instruction, when receiving the instruction.

14. The non-transitory computer-readable storing medium according to claim 12, wherein in the application control program, the application includes identification information of the image forming apparatus, for which an operation of the application itself is permitted among the plurality of the image forming apparatuses, the application control program causes the image forming apparatus that achieves the installation execution unit to achieve an activation execution unit that causes the image forming apparatus to execute activation of the application by an activation key being information for activation of the application, the file transmission unit transmits the file to the first image forming apparatus when the identification information of the first image forming apparatus is included in the application, in a case where the file is requested by the first image forming apparatus, the installation execution unit installs the application by using the file transmitted from the second image forming apparatus when requesting the second image forming apparatus for the file, the activation execution unit causes the image forming apparatus to operate the application by causing the image forming apparatus to execute activation of the application by the activation key when the identification information of the image forming apparatus is not included in the application, and the activation execution unit causes the image forming apparatus to operate the application, even when the image forming apparatus is not caused to execute activation of the application by the activation key in a case where the installation execution unit installs the application by using the file transmitted from the second image forming apparatus.

* * * * *